US012592765B2

(12) United States Patent
Anderson et al.

(10) Patent No.: US 12,592,765 B2
(45) **Date of Patent: *Mar. 31, 2026**

(54) SOFTWARE-DEFINED FILTERING IN A REPEATER

(71) Applicant: Wilson Electronics, LLC, St. George, UT (US)

(72) Inventors: Dale Robert Anderson, Colleyville, TX (US); Casey James Nordgran, Ivins, UT (US); Christopher Ken Ashworth, Toquerville, UT (US); Ilesh V. Patel, Euless, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,500

(22) Filed: Jul. 18, 2023

(65) Prior Publication Data

US 2023/0361854 A1     Nov. 9, 2023

Related U.S. Application Data

(63) Continuation of application No. 17/372,038, filed on Jul. 9, 2021, now Pat. No. 11,705,958.

(60) Provisional application No. 63/050,684, filed on Jul. 10, 2020.

(51) Int. Cl.
| | |
|---|---|
| *H04B 7/155* | (2006.01) |
| *H04L 5/14* | (2006.01) |
| *H04W 24/08* | (2009.01) |
| *H04W 52/52* | (2009.01) |

(52) U.S. Cl.
CPC .............. *H04B 7/155* (2013.01); *H04L 5/14* (2013.01); *H04W 24/08* (2013.01); *H04W 52/52* (2013.01)

(58) Field of Classification Search
CPC ....... H04B 7/155; H04B 7/15535; H04L 5/14; H04W 24/08; H04W 52/52
See application file for complete search history.

(56) References Cited

U.S. PATENT DOCUMENTS

| | | | | |
|---|---|---|---|---|
| 2003/0114103 A1* | 6/2003 | Dinkel | ............... | H04B 7/15514 |
| | | | | 455/21 |
| 2006/0019604 A1* | 1/2006 | Hasarchi | .................. | H04B 1/71 |
| | | | | 455/15 |
| 2009/0209201 A1* | 8/2009 | Park | ....................... | H04B 7/155 |
| | | | | 455/20 |
| 2016/0014705 A1* | 1/2016 | Tani | ..................... | H04B 1/1036 |
| | | | | 370/252 |
| 2019/0280759 A1* | 9/2019 | Bennett | ............... | H04W 88/085 |
| 2020/0028567 A1* | 1/2020 | Ashworth | ............ | H04B 1/0057 |

\* cited by examiner

*Primary Examiner* — Kan Yuen
(74) *Attorney, Agent, or Firm* — Thorpe North & Western, LLP.

(57) ABSTRACT

Technology for a repeater is disclosed. The repeater can include a first antenna port and a second antenna port. The repeater can include a first uplink analog signal amplification and filtering path and a second uplink analog signal amplification and filtering path. The repeater can include a first downlink analog signal amplification and filtering path and a second downlink analog signal amplification and filtering path. The repeater can include an uplink software-defined filtering (SDF) module and a downlink SDF module.

22 Claims, 12 Drawing Sheets

SOFTWARE-DEFINED FILTERING IN A REPEATER

RELATED APPLICATION(S)

Priority is claimed to U.S. patent application Ser. No. 17/372,038, filed Jul. 9, 2021, which claims benefit to U.S. Provisional Patent Application Ser. No. 63/050,684, filed Jul. 10, 2020, which is hereby incorporated by reference in its entirety.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
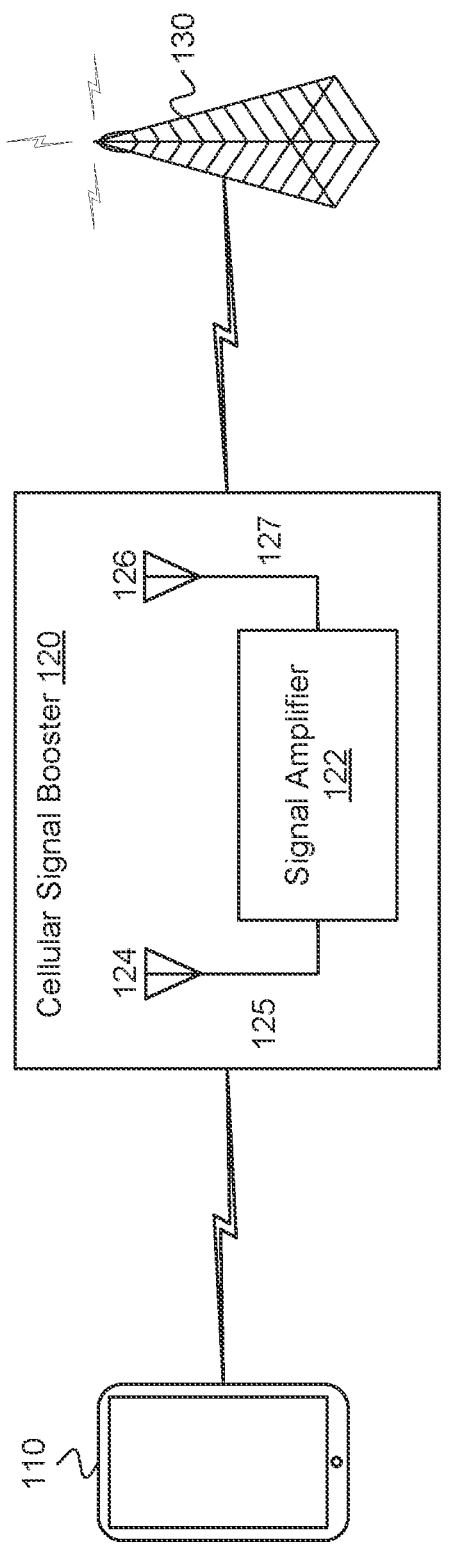
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB) or gNB, a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15, or 16, 3GPP 5G Release 15 or 16, or Institute of Electronics and Electrical Engineers (IEEE) 802.16. In one configuration, the repeater 220 can boost signals for 3GPP LTE Release 16.0.0 (January 2019) or other desired releases. The signal booster 120 can boost signals from the 3GPP Technical Specification (TS) 36.101 (Release 15 Sep. 2017) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-85 or other bands, as disclosed in 3GPP TS 36.104 V16.0.0 (January 2019). The signal booster can be configured to meet the 3GPP TS 36.106 V16.0.0 (July 2021) and 38.106 V0.0.1 (April 2021) specification requirements.

In another configuration, the repeater 220 can boost signals from the 3GPP Technical Specification (TS) 38.104 (Release 15 Jan. 2019) bands or 5G frequency bands. In addition, the repeater 220 can boost selected frequency bands based on the country or region in which the repeater is used, including any of bands n1-n86, n257-n261, or other bands, as disclosed in 3GPP TS 38.104 V15.4.0 (January 2019).

The number of 3GPP LTE or 5G frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 decibel-milliwatts (dBm). The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

Signal boosters can suffer from a near-far problem. Some base stations can be nearby to a repeater while other base stations can be further away from the repeater. As a result, a strong signal from a near signal source can make it difficult for a receiver to hear a weaker signal from a further signal source due to adjacent-channel interference, co-channel interference, distortion, capture effect, dynamic range limitation, or the like. To address the near-far problem, analog channelized filtering can be used, but has many limitations, such as an inflexible pass bandwidth. On the other hand, digital channelized filtering can be flexible, but costs more and has dynamic range limitations.

In the present technology, digital channelized filtering can be performed using software-defined filtering (SDF) module(s) in a repeater or signal booster. A software-defined filtering module can include a combination of analog and digital filters. A software-defined filtering module can include a digital signal processor (DSP) and digital baseband filters. A software-defined filtering module can receive an analog signal, convert the analog signal to a digital signal and perform digital processing at baseband on the digital signal. In one embodiment, the SDF can convert the digitally filtered signal from baseband back to an analog signal, such as the RF carrier frequency received at the input of the SDF. Alternatively, the SDF can output the digitally filtered signal without conversion to analog. In one embodiment, a software-defined filtering module can be configured to down convert a radio frequency (RF) analog cellular signal received at the SDF at an RF carrier frequency to baseband, digitize the baseband signal. Digital signal processing or digital filtering (e.g., Finite Impulse Response (FIR) filtering or Infinite Impulse Response (IIR) filtering) can then be applied to the digital signal at baseband. In one embodiment, the digital signal can then be converted to analog and upconverted to the same RF carrier frequency the signal was received at. The RF analog signal that is outputted from the software-defined filtering module can be considered a repeated analog signal. Additional amplification and filtering can be performed on the RF analog signal output from the SDF module. Alternatively, the digital signal can be communicated digitally to another SDF module that can then convert the digital signal to analog and upconvert to the RF carrier frequency. The SDF module can perform digital channelized filtering for repeaters that can be useful to address near-far problems associated with repeaters.

Figure 2:
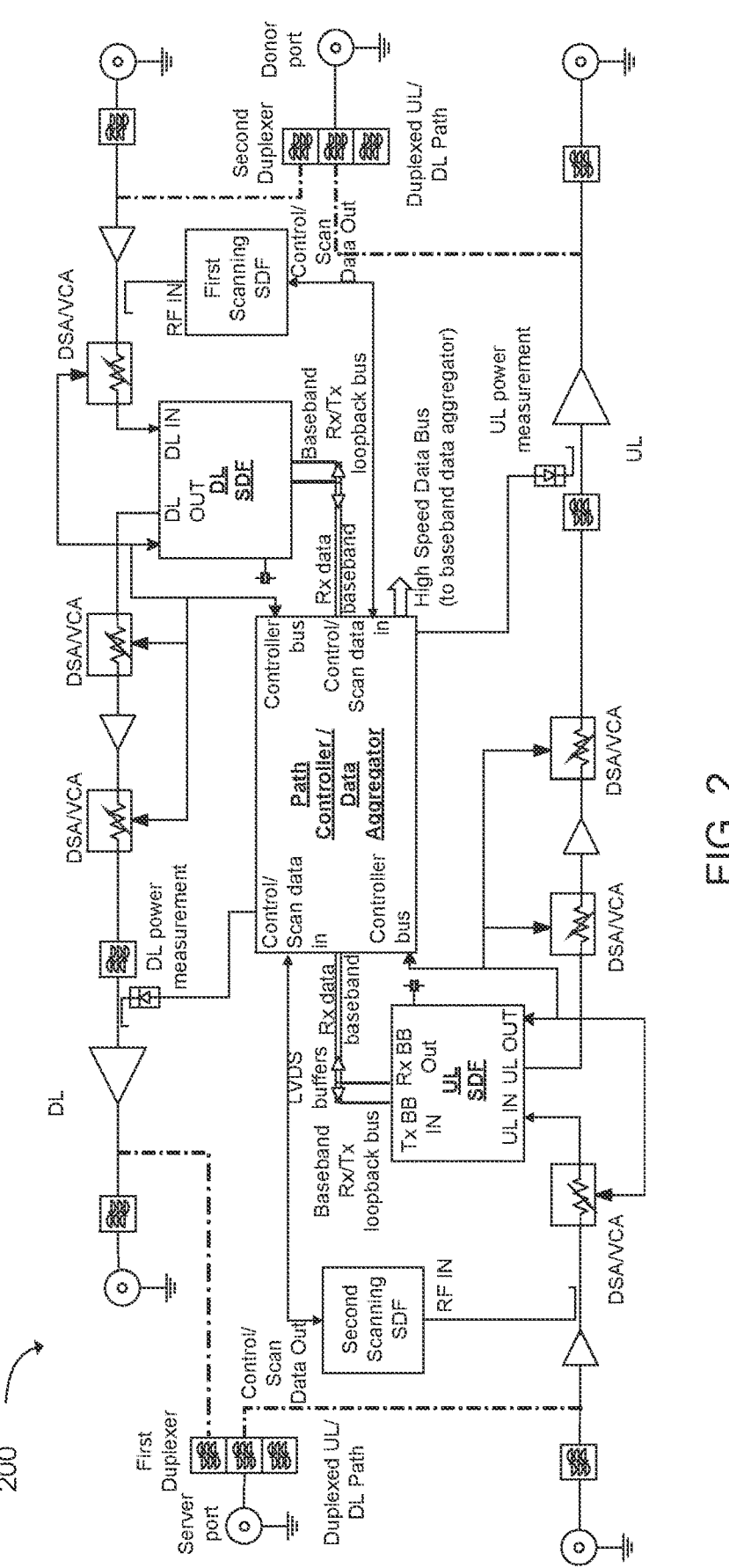
FIG. 2 illustrates a repeater that includes software-defined filtering in accordance with an example.

FIG. 2 illustrates an exemplary repeater 200 that includes software-defined filtering. The repeater 200 can be a digital channelized repeater that employs software-defined filtering. The repeater 200 can include a server port communicatively coupled to a server antenna, and a donor port communicatively coupled to a donor antenna. In one example, the repeater 200 can include multiple server ports and multiple server antennas, respectively, and the repeater 200 can include multiple donor ports and multiple donor antennas, respectively. The server port can be communicatively coupled to a first duplexer, and the donor port can be communicatively coupled to a second duplexer.

In one example, in a downlink direction of the repeater 200, the repeater can include a first analog signal amplification and filtering path, a downlink software-defined filtering (SDF) module, and a second analog signal amplification and filtering path. The first analog signal amplification and filtering path can be communicatively coupled to the donor port. The second analog signal amplification and filtering path can be communicatively coupled to the server port. The software-defined filtering module can be communicatively coupled between the first analog signal amplification and filtering path and the second analog signal amplification and filtering path. In this example, the first analog signal amplification and filtering path (i.e., prior to the downlink SDF) can include one or more filters and one or more amplifiers, and the second analog signal amplification and filtering path (i.e., after the downlink SDF) can include one or more filters and one or more amplifiers. In other words the downlink SDF can include a DL input (IN) that is coupled to the first analog signal amplification and filtering path, and a DL output (OUT) that is coupled to the second analog signal amplification and filtering path.

In one example, in an uplink direction of the repeater 200, the repeater can include a third analog signal amplification and filtering path, an uplink software-defined filtering (SDF) module, and a fourth analog signal amplification and filtering path. The third analog signal amplification and filtering path can be communicatively coupled to the server port. The fourth analog signal amplification and filtering path can be communicatively coupled to the donor port. The software-defined filtering module can be communicatively coupled between the third analog signal amplification and filtering path and the fourth analog signal amplification and filtering path. In this example, the third analog signal amplification and filtering path (i.e., prior to the uplink SDF) can include one or more filters and one or more amplifiers, and the fourth analog signal amplification and filtering path (i.e., after the uplink SDF) can include one or more filters and one or more amplifiers. In other words the uplink SDF can include an UL IN that is coupled to the third analog signal amplification and filtering path, and an UL OUT that is coupled to the fourth analog signal amplification and filtering path.

In one example, the first, second, third and fourth analog signal amplification and filtering paths can each include one or more attenuators. The attenuators can be digital step attenuators (DSAs) or voltage controlled attenuators (VCAs).

In one example, the DL SDF can include digital filtering at baseband and can create a dynamically adjustable passband over a defined frequency range for a downlink analog signal. The DL SDF can include a receive path and a transmit path, which can each include one or more of: a digital signal processor (DSP), a digital-to-analog converter (DAC), an analog-to-digital converter (ADC), a gain block, a multiplexer, a demultiplexer, a log power detector, one or more digital filters or one or more analog filters. The one or more digital filters can include an infinite impulse response (IIR) filter and/or a finite impulse response (FIR) filter. The DL SDF can include a DL IN that receives an analog signal as an input and a DL OUT that outputs a modified analog signal. Further, the DL SDF can output baseband data to a controller (e.g., a path controller and data aggregator).

In one example, the controller (e.g., the path controller and data aggregator) can be a field programmable gate array (FPGA) that controls single/multiple UL/DL SDFs. In another example, the controller can include several FPGAs controlling several SDFs on several signal paths. In yet another example, the controller can be a single FPGA controlling all the SDFs in the repeater 200.

In one example, the UL SDF can include digital filtering at baseband and can create a dynamically adjustable passband over a defined frequency range for an uplink analog signal. The UL SDF can include a receive path and a transmit path, which can each include one or more of: a DSP, a DAC, an ADC, a gain block, a multiplexer, a demultiplexer, a log power detector, one or more digital filters or one or more analog filters. The one or more digital filters can include an IIR filter and/or a FIR filter. The UL SDF can include an UL IN that receives an analog signal as an input and an UL OUT that outputs a modified analog signal. Further, the UL SDF can output baseband data to the controller.

In one example, a DL power measurement can be performed using the outputted baseband data from the DL SDF.

In other words, a DL received signal strength indicator (RSSI) can be measured before a final downlink stage in the repeater 200. In another example, an UL power measurement can be performed using the outputted baseband data from the UL SDF. In other words, an UL RSSI can be measured before a final uplink stage in the repeater 200. In these examples, the DL power measurement and/or the UL power measurement can be measured using an external circuit that receives the outputted baseband data from the DL SDF or the UL SDF.

In one configuration, the repeater 200 can perform automatic gain control (AGC) by frequency range (e.g., channel or band) in an uplink for network protection. The repeater 200 can AGC an uplink signal that needs to be reduced as opposed to a whole band, although this approach can be computationally intensive as uplink signal powers can vary. As a result, the repeater 200 can determine AGC levels on a per-frequency range basis (or on a per-channel or per-band basis) by adjusting the dynamically adjustable passband created using the DL SDF (or UL SDF). The dynamically adjustable passband created by the DL SDF or UL SDF can be used to notch out a defined frequency range (i.e., a notch can be added depending on a signal strength). An adjustment to the dynamically adjustable passband can be subject to a delay, such as one second, two seconds, five seconds, etc. Further, the frequency range can be a channel (which can be a subset of a band) or a band.

In one example, the AGC can be an uplink-by-uplink AGC. In this example, an uplink signal can be received and an AGC level can be applied to the uplink signal. In another example, for network protection, the AGC can be uplink-by-downlink AGC. In this example, a downlink signal can be received and an AGC level can be applied to the downlink signal (i.e., AGC can be applied to the uplink gain and noise power based on a downlink input signal). In yet another example, the AGC can be a downlink-by-downlink AGC. In this example, a downlink signal can be received and an AGC level can be applied to the downlink signal to maintain linearity.

In one example, for uplink-by-downlink AGC, frequency division duplex (FDD) uplink and downlink can be on different frequencies but correlated channels, so measuring the downlink can allow an AGC level to be applied to the correlated uplink channel. In another example, for uplink-by-downlink AGC, time division duplex (TDD) uplink and downlink channel frequencies can be the same. Thus, the repeater 200 can perform both uplink-by-uplink AGC and downlink-by-uplink AGC (for network protection), such that the repeater 200 can perform AGC channel-by-channel in a multi-channel (broadband) passband. In other words, the repeater 200 can create a multi-channel passband and perform AGC on all of the channels, but on a per-channel (or frequency range) basis. Further, the repeater 200 can use the DL SDF and/or the UL SDF to create the dynamically adjustable passband to include one or more channels.

In one example, the ability to perform AGC on a channel-by-channel manner can provide a different response for each channel. For example, the repeater 200 can provide a full gain in a first channel, medium gain in a second channel and no gain in a third channel, where a determination on whether to provide full gain, medium gain, low or on gain, etc. can be made dynamically. For example, the third channel can transition from no gain to medium gain as an input signal channels. In one example, a maximum output of the repeater 200 can be limited to a certain power, and based on the performance of AGC on a channel-by-channel manner, a maximum output power for each channel can be determined.

As a result, the repeater 200 can employ level loading for signals, in that a maximum power can be obtained out of each channel without using power for the other channels. With level loading, channels that are nearer to the repeater 200 can be treated differently as compared to channels that are further away from the repeater 200. For example, channels that are closer to the repeater can be attenuated more than channels that are further away from the repeater 200. Channels that are further away may not be attenuated at all or attenuated minimally, as those signals can be directed with maximum gain.

In one example, the controller can receive the DL power measurement of a downlink analog signal at a defined frequency range from the DL SDF. For example, a frequency range power (e.g., a channel power) can be obtained at the DL SDF after baseband filtering. The controller can determine an AGC level for an uplink analog signal based on the DL power measurement. The controller can apply the AGC level to the uplink analog signal.

In one example, AGC can be performed channel-by-channel in an uplink-by-downlink manner. In other words, AGC can be performed in an uplink based on a power of a downlink signal. In another example, AGC can be performed channel-by-channel in an uplink-by-uplink manner. In other words, AGC can be performed in an uplink based on a power of an uplink signal. In some cases, the uplink-by-uplink manner may not be used because mobile devices often already employ dynamic range features, in which an output power can be varied based on channel conditions. A base station does not typically change its output power, so the mobile devices can adjust their output power to compensate for the distance between the mobile devices and the base station.

In one configuration, a first scanning SDF can be communicatively coupled to the first analog signal amplification and filtering path, and a second scanning SDF can be communicatively coupled to the third analog signal amplification and filtering path. The first and second scanning SDFs can be included on first and second detector paths that are communicatively coupled to the first and third analog signal amplification and filtering paths, respectively. The first and second scanning SDFs can be used to monitor and measure a power level of one or more frequency ranges. In other words, the first and second scanning SDFs can be used to monitor an entire band, such that the band can be scanned with disturbing amplification that occurs on the first and third analog signal amplification and filtering paths. Further, an AGC level can be selectable based on the measured power level of the one or more frequency ranges.

In one example, the first scanning SDF can be included in a tapped detector line prior to the DL SDF, and the second scanning SDF can be included in a tapped detector line prior to the UL SDF. By positioning the first and second scanning SDFs prior to the DL SDF and the UL SDF, respectively, broadband signals can be analyzed and modified without affecting the main downlink and uplink signal paths. The first and second scanning SDFs on the separate detector lines can be useful for determining AGC values for the uplink and/or downlink, without having to sweep an actual signal path and affect the signal being transmitted. In one example, the first and second scanning SDFs can sweep a band without disturbing the signal (e.g., sweep with a 1 MHz resolution across a 60 MHz wide band).

In one configuration, the repeater 200 can include a single SDF scanning block. For example, the repeater 200 can include a switch between uplink and downlink couplers, such that the single SDF scanning block can be used to monitor both uplink and downlink paths. In other words, the switch between the uplink and downlink couplers can be employed such that the single SDF scanning block can be used to monitor both the server and donor ports.

In one configuration, the repeater 200 can include a first pass through signal path communicatively coupled between the first analog signal amplification and filtering path and the second analog signal amplification and filtering path in the downlink direction. The first pass through signal path can form a switchable bypass path to bypass the DL SDF. Further, the repeater 200 can include a second pass through signal path communicatively coupled between the third analog signal amplification and filtering path and the fourth analog signal amplification and filtering path in the uplink direction. The second pass through signal path can form a switchable bypass path to bypass the UL SDF.

In one example, the DL SDF and the UL SDF in the repeater 200 results in down converting, digitizing and other actions, which can create additional delays in the repeater 200. In certain cases, the use of SDF in the repeater may not be needed. For example, base stations can be located far away from the repeater 200 and users are located relatively far away from the repeater 200, and there can be no network saturation problems and no network protections that are to be applied. In this case, the DL SDF and the UL SDF can be bypassed. In other words, received analog signals can remain analog and may not be down converted and digitized, at least for a period of time before the situation changes. The repeater 200 can have digitization available, which can be switched on when needed. For example, if there is a signal that is strong enough to need a digital filter, the DL and UL SDFs can be switched in (i.e., a custom SDF filter can be applied and down conversion can be performed). Otherwise, the repeater 200 can operate in a broadband-analog mode.

In one configuration, the controller can select a defined frequency range for a dynamically adjustable passband created using the DL SDF or UL SDF. More specifically, the controller can select the defined frequency range for the dynamically adjustable passband based on a received carrier signal. The DL SDF or UL SDF can be used to analyze spectrum and identify existing carriers, and can be tuned specifically to a carrier and channelized based on the received carrier signal in the band to optimize the digital filtering. In other words, based on the received carrier signal, the repeater 200 can be aware of a surrounding environment and select the defined frequency range for the dynamically adjustable passband accordingly. The repeater 200 can tune automatically to the required or desired carrier.

In one configuration, the controller can determine (e.g., using a modem) a Reference Signal Received Power (RSRP) and/or Reference Signal Received Quality (RSRQ) of an analog signal received in the defined frequency range. The RSRP and/or RSRQ can be determined on a channel-by-channel basis. The controller can apply a network protection to the defined frequency range based on the RSRP and/or RSRQ. More specifically, a custom network protection standard can be applied to each channel based on the RSRP and/or RSRQ of that channel. In one example, the controller can detect a power level at which a base station is transmitting on each channel (e.g., carrier-specific selectability) and a power level at which a mobile device is transmitting, and the controller can extrapolate a mobile phone distance from a server antenna of the repeater 200, which can aid the controller when applying the network protection.

In contrast, in past solutions, network protection can be performed on a composite signal received at the donor antenna, and is not performed on a channel-by-channel basis. In the present solution, every single channel can be attenuated based on its received signal level. As a result, network protections can be level loaded, such that the RSRP and/or RSRQ values can be determined appropriate uplink power for each of the channels.

In one configuration, the donor antenna and the server antenna can be rotarized or motorized antennas which receive and amplify analog signals based on carriers associated with the analog signals. The rotarized antennas can be auto-steerable and directed based on detected signal qualities of the received analog signals. In this configuration, the repeater 200 can include SDF front-ends for each carrier, which can then be digitally combined.

In one configuration, the controller can implement a connectivity as a service (CaaS) feature, in which specific carriers can be turned on/off or enabled/disabled. For example, if one customer wants only a first carrier and a second carrier, all channels or frequency ranges for a third carrier can be turned off or disabled. In another example, customers can be charged per carrier that the repeater 200 supports.

Figure 3:
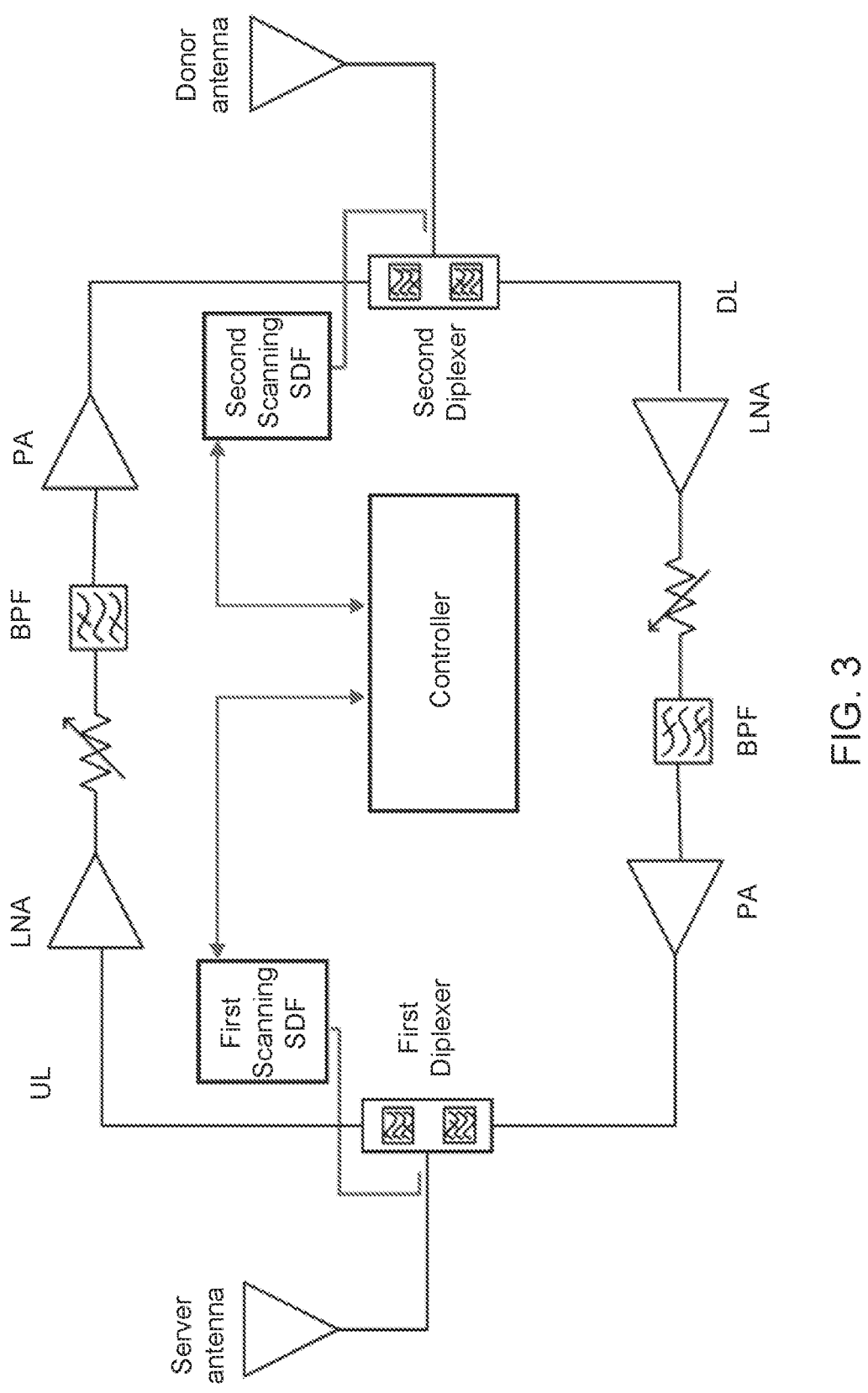
FIG. 3 illustrates a repeater that includes software-defined filtering in accordance with an example.

FIG. 3 illustrates an example of a repeater 300 that includes software-defined filtering. The repeater 300 can be a digital channelized repeater that employs software-defined filtering. The repeater 300 can include a server antenna and a donor antenna. A first diplexer can be communicatively coupled to the server antenna, and a second diplexer can be communicatively coupled to the donor antenna. A downlink signal path can be communicatively coupled between the server antenna and the donor antenna. The downlink signal path can include one or more filters (e.g., bandpass filters (BPFs)), one or more amplifiers (e.g., a power amplifier (PA) and a low noise amplifier (LNA)), and a variable attenuator. Further, an uplink signal path can be communicatively coupled between the server antenna and the donor antenna. The uplink signal path can include one or more filters (e.g., BPFs), one or more amplifiers (e.g., PA and LNA) and a variable attenuator.

In one example, the repeater 300 can include a first scanning SDF in proximity to the first diplexer and a second scanning SDF in proximity to the second diplexer. The scanning SDFs can be inserted to monitor the spectrum in and around several frequency ranges (e.g., cellular bands) on both the donor and server ports. The first and second scanning SDFs can be communicatively coupled to a controller (e.g., a path controller and data aggregator). In other words, scan data from the first scanning SDF can be provided to the controller, and scan data from the second scanning SDF can be provided to the controller. By employing the first and second scanning SDFs in the repeater 300, repeater (or booster) instability, in band/out of band interference and cellular band radio frequency (RF) activity can be measured and/or monitored.

In one example, the out of band interference can be significantly reduced by employing the SDFs to filter out-of-band regions adjacent to a desired band. The SDF can be used to block signals at the edges (out-of-band ranges adjacent to) of the desired band, thereby increasing the signal to interference plus noise ratio (SINR) of a signal in the desired band.

Figure 4:
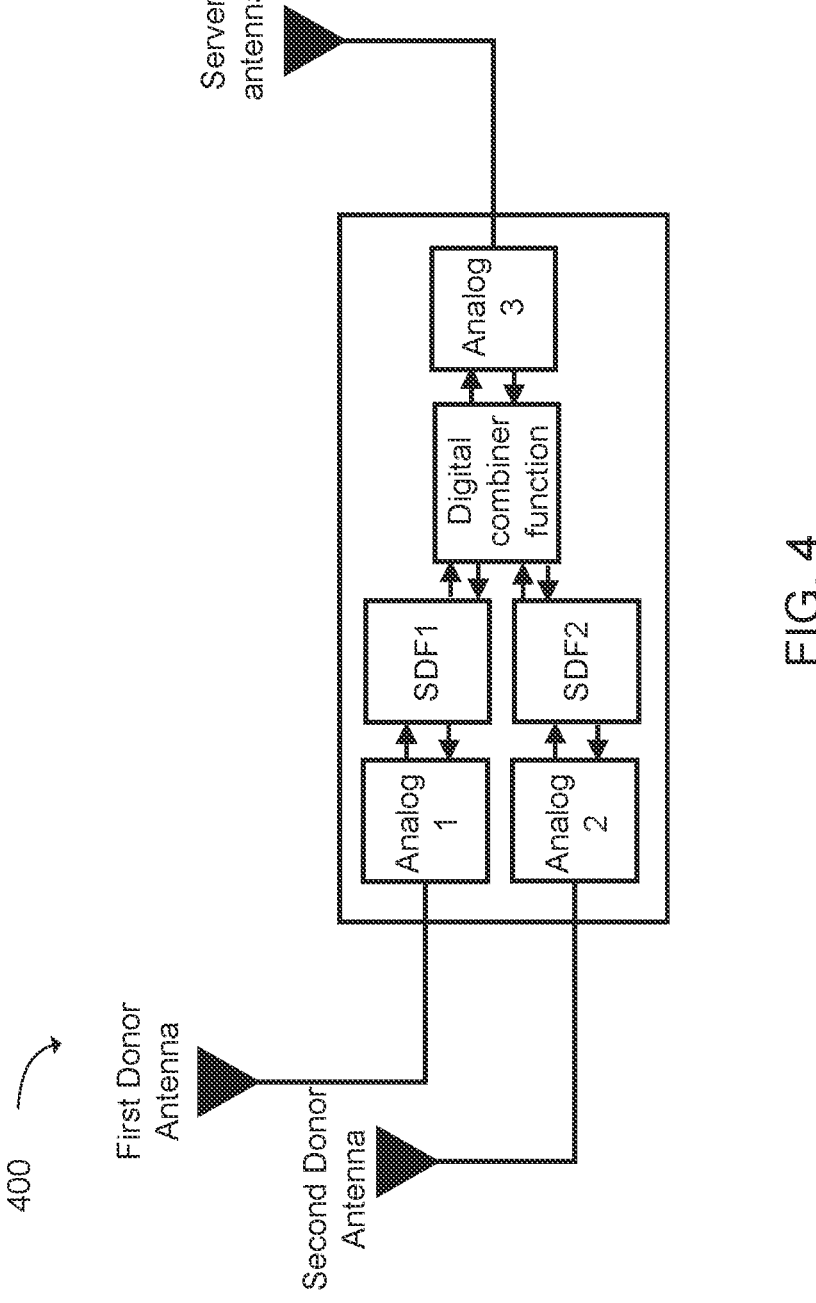
FIG. 4 illustrates a repeater that uses software-defined filtering and combines multiple received donor signals in accordance with an example.

FIG. 4 illustrates an example of a repeater 400 that uses software-defined filtering and combines multiple received donor signals. The repeater 400 can be a digital channelized repeater that employs software-defined filtering. In this example, multiple-input, multiple-output (MIMO) can be implemented through the single repeater 400. The repeater 400 can use software-defined filtering (SDF) to add delays or gain adjustments to each frequency range (e.g., channel or band) to create (or account for) delay spread. Further, the repeater 400 can create or offset an effect of a fading path. Further, the repeater 400 can include multiple donor antennas to receive signals, and maximal ratio combining or a similar technique can be implemented to pipe a MIMO signal through a single server antenna of the repeater 400. In this example, the repeater 400 can use a digital combiner function (or digital signal processing (DSP) function) to intelligently combine the received donor signals for output via the single server antenna.

In one example, the repeater 400 can include a first donor antenna coupled to a first donor antenna port, a second donor antenna coupled to a second donor antenna port, and a server antenna coupled to a server antenna port. The repeater 400 can include a first analog signal amplification and filtering path (Analog 1) communicatively coupled to the first donor antenna port. The repeater 400 can include a second analog signal amplification and filtering path (Analog 2) communicatively coupled to the second donor antenna port. The repeater 400 can include a third analog signal amplification and filtering path (Analog 3) communicatively coupled to the server antenna port.

In one example, the repeater 400 can include a first software-defined filtering (SDF1) module communicatively coupled to the first analog signal amplification and filtering path, as well as a second software-defined filtering (SDF2) module communicatively coupled to the second analog signal amplification and filtering path. The first software-defined filtering module and the second software-defined filtering module can add delays or gain adjustments to each frequency range to create or account for delay spread. Further, the first software-defined filtering module and the second software-defined filtering module can create or offset an effect of one or more fading paths.

In one example, the repeater 400 can include a digital combiner function communicatively coupled between the first software-defined filtering module, the second software-defined filtering module and the third analog signal amplification and filtering path. The digital combiner function can be operable to combine received signals from the first software-defined filtering module and the second software-defined filtering module.

In one configuration, the first donor antenna port can receive a first downlink analog signal. The second donor antenna port can receive a second downlink analog signal. The first software-defined filtering module can convert the first downlink analog signal to first baseband data. The second software-defined filtering module can convert the second downlink analog signal to second baseband data. The digital combiner function can digitally combine the first baseband data and the second baseband data to form a single downlink signal. The single downlink signal can be provided to the third analog signal amplification and filtering path. The analog signal amplification and filtering path can convert the single downlink signal to a repeated downlink analog signal for transmission via the server antenna.

In one configuration, the repeater 400 can include multiple server antenna ports and/or donor antenna ports. The server antenna ports and the donor antenna ports can be associated with signal paths corresponding to certain frequency ranges or channels. A digital filter, such as a software-defined filtering module, can be communicatively coupled to each of the multiple server antenna ports, and the signal paths associated with the multiple server antenna ports can be combined digitally. Similarly, a digital filter, such as a software-defined filtering module, can be communicatively coupled to each of the multiple donor antenna ports, and the signal paths associated with the multiple donor antenna ports can be combined digitally. The repeater 400 can identify which channels are coming through which server antenna ports (or donor antenna ports). If one server antenna port has a low channel and the other server antenna port is receiving a high channel, digital filters can be coupled to each server antenna port and the corresponding paths (or channels) can be combined. On the server antenna port corresponding to the low channel, the high band can be filtered out and can be combined with the other server antenna port that has filtered out the low band. The two channels can be combined together digitally without causing a noise power increase on an opposite channel.

In contrast, in past solutions, a repeater may not employ digital filtering, the repeater can include multiple donor antenna ports and/or multiple server antenna ports. For example, two server antenna ports can be combined into one uplink. In other words, the two server antenna ports are separate until combined, and then there is one uplink path from thereon. When combined using past solutions, the repeater is operating in broadband, so combining the paths corresponding to the two server antenna ports can also result in combining the nose powers, thereby increasing an effective transmitted noise power from the repeater. The amount of effective transmitted noise power can depend on the number of ports (e.g., server antenna ports or donor antenna ports) that are being combined. By employing digital filtering in repeaters, signal paths and channels can be combined together digitally without increasing the noise power.

In the example shown in FIG. 4, the repeater 400 can achieve a MIMO benefit or a multi-user MIMO benefit through a single-input single-output (SISO) repeater. By using SDFs, the repeater 400 can receive signals on each channel. A Rayleigh fading process can be applied to specific channels after the signals have been boosted, and then the signals can be combined digitally, which can preserve the MIMO benefit. In one example, a fading simulator can be inserted on a port (e.g., a server antenna port or a donor antenna port) in which the MIMO benefit is to be preserved (i.e., a port in which a MIMO signal is to be received and preserved in the repeater 400). In cellular repeaters, MIMO can be performed in the downlink and/or the uplink.

Figure 5:
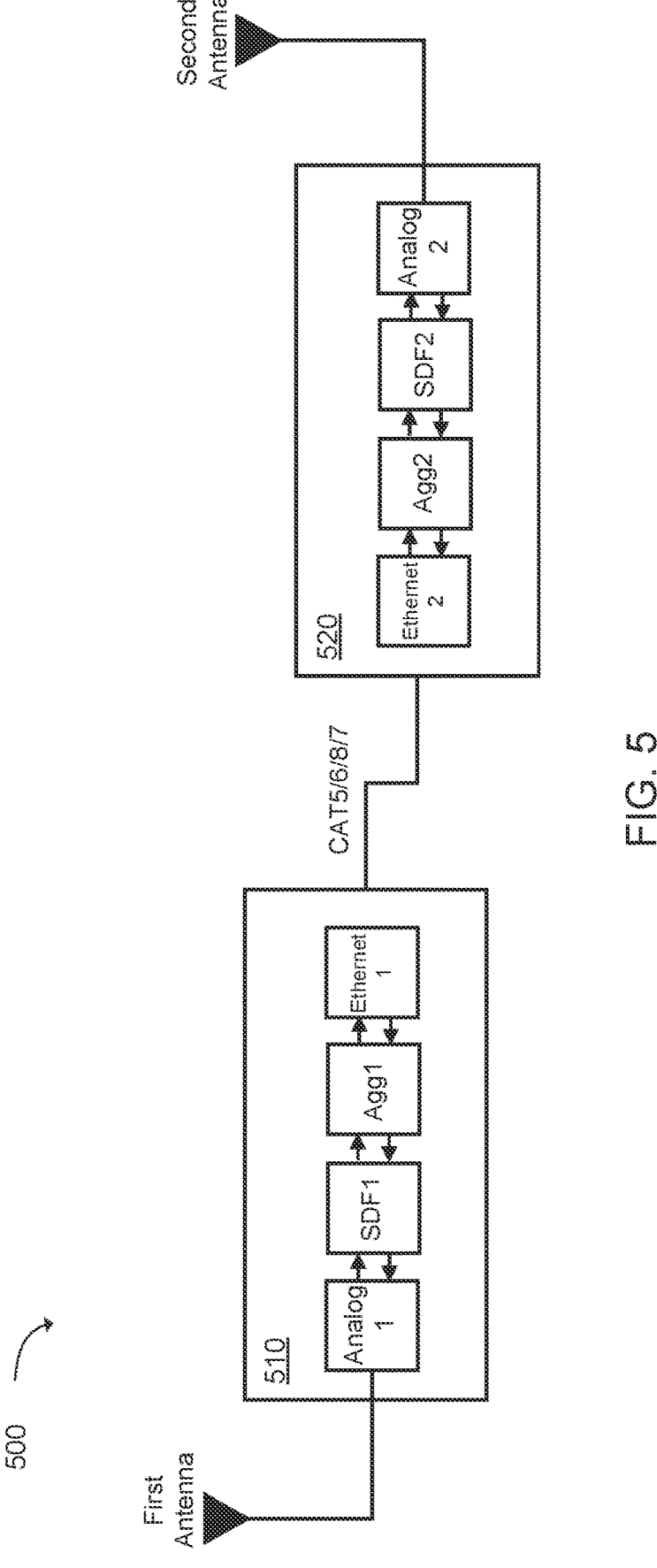
FIG. 5 illustrates a digital repeater system in accordance with an example.

FIG. 5 illustrates an example of a digital repeater system 500. The digital repeater system 500 can include a first repeater unit 510 and a second repeater unit 520. The first repeater unit 510 and the second repeater unit 520 can be digital channelized repeater units that employ software-defined filtering. The digital repeater system 500 can include a first antenna and a second antenna. In one example, the first repeater unit 510 can be an in-line repeater unit and the second repeater unit 520 can be a main repeater unit, and the first antenna can be a server antenna and the second antenna can be a donor antenna. The first repeater unit 510 and the second repeater unit 520 can be connected using a cable. In other words, the digital repeater system 500 can include a cable that connects the first repeater unit 510 and the second repeater unit 520. The cable can be a fiber-optic cable or a Category (Cat) 5/6/7/8 coaxial cable.

In one example, the first repeater unit 510 can include a first antenna port communicatively coupled to the first antenna. The first antenna port can receive a radio frequency (RF) analog signal. The first repeater unit 510 can include a first analog signal amplification and filtering path (Analog 1) communicatively coupled to the first antenna port. The first repeater unit 510 can include a first software-defined filtering (SDF1) module configured to convert the RF analog signal to baseband data. The first repeater unit 510 can include a first digital communication port (e.g., a first Ethernet port, or Ethernet 1, or a first fiber optic port) to transmit the baseband data.

Further, the second repeater unit 520 can include a second digital communication port (e.g., a second Ethernet port, or Ethernet 2, or a second fiber optic port) to receive the baseband data). The baseband data can be received over the cable connecting the first repeater unit 510 and the second repeater unit 520. The second repeater unit 520 can include a second software-defined filtering (SDF2) module to convert the baseband data to a repeated RF analog signal. The second repeater unit 520 can include a second analog signal amplification and filtering path (Analog 2) communicatively coupled to a second antenna port. The second antenna port can be communicatively coupled to the second antenna. The second antenna can transmit the repeated RF analog signal.

In one example, the first antenna (e.g., the server antenna) of the first repeater unit 510 can receive an uplink signal, which can be amplified and filtered using analog and digital components to create a repeated uplink signal. The repeated uplink signal can be transmitted from the second antenna (e.g., the donor antenna) of the second repeater unit 520. In another example, the second antenna of the second repeater unit 520 can receive a downlink signal, which can be amplified and filtered using analog and digital components to create a repeated downlink signal. The repeated downlink signal can be transmitted from the first antenna of the first repeater unit 510.

In one example, the first repeater unit 510 can include a first data aggregator (Agg1) between the first software-defined filtering module and the first digital communication port (e.g., a first Ethernet port), and the second repeater unit 520 can include a second data aggregator (Agg2) between the second software-defined filtering module and the second digital communication port (e.g., a second Ethernet port). In a specific example, the first and second data aggregators can be digital-to-Ethernet converter blocks between the SDFs and the Ethernet ports (e.g., Ethernet MAC/aggregator and de-aggregator). The first and second data aggregators can be field programmable gate arrays (FPGAs), and can be used to handle timing skews across the different bands and the different integrated circuits (ICs). In one example, multiple SDF chips can be combined to a single Ethernet link. For example, the first repeater unit 510 and/or the second repeater unit 520 can include multiple SDFs, which can be combined using the first and second data aggregators, as data between the first repeater unit 510 and the second repeater unit 520 is to be transmitted on the single Ethernet link.

In one example, the first data aggregator (agg1) and the second data aggregator (Agg2) can each include an aggregation function and a de-aggregation function. The first data aggregator and the second data aggregator can each support uplink and downlink, so each of the first data aggregator and the second data aggregator can include an aggregator and a de-aggregator.

In one example, the first repeater unit 510 (e.g., the in-line repeater unit) can receive data over the fiber-optic cable or the Cat 5/6/7/8 cable due to digitization. For example, the digital repeater system 500, which employs the first repeater unit 510 and the second repeater unit 520 digitally, can offer various advantages due to no or minimal loss over the cable connecting the first repeater unit 510 and the second repeater unit 520. In other words, a digital connection between the first repeater unit 510 and the second repeater unit 520 can result in no or minimal analog insertion losses. Further, the digital repeater system 500 can in-line boost low bands as well as high bands.

In one example, an analog radio can include an analog path. The analog radio can include an analog radio receiver, in which mixing, filtering and demodulation functions can be fixed in hardware. A receive frequency can be configured with a tunable front end, but filter bandwidth, gain and/or demodulation can be fixed.

In one example, a software defined radio (SDR) is a radio that performs traditional analog radio functions through software and digitally configurable hardware. An SDR can include analog and digital paths. The SDR can include an analog/digital radio receiver, in which mixing, filtering, amplifying and demodulation functions are split between the hardware and digital domains. A receive frequency can be configured with a tunable front end, and filter bandwidth, gain and/or demodulation can be configurable.

Figures 6A, 6B:
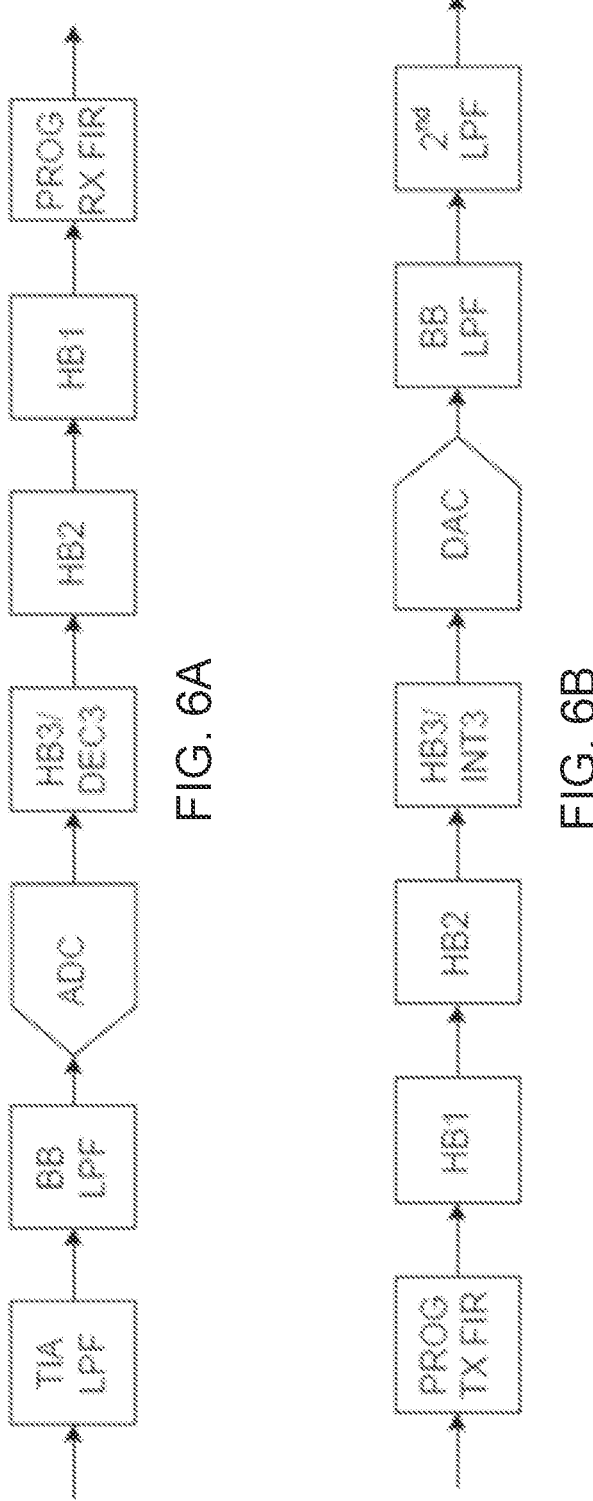
FIG. 6A illustrates an input signal path of a software-defined filtering module in accordance with an example.
FIG. 6B illustrates an output signal path of a software-defined filtering module in accordance with an example.

FIG. 6A illustrates an example of a receive (Rx) (or input) signal path of a software-defined filtering module. The receive signal path can include an amplifier, such as a transimpedance amplifier (TIA) low pass filter (LPF), a baseband (BB) LPF, an analog-to-digital converter (ADC), a first half-band filter (HB3 with a fixed coefficient (DEC3), a second half-band filter (HB2), a third half-band filter (HB1) and a programmable (PROG) receive (Rx) finite impulse response (FIR) filter.

In this example, the HB3/DEC3, HB2, HB1 and PROG Rx FIR are programmable filters that can make up an increased percentage of the SDF response. While these filters are provided as examples, they are not intended to be limiting. Certain embodiments of SDF modules can include a variety of types of digital filters based on the needs of the system specification. Further, in this example, the analog and digital paths can be separated by the ADC. Before the DAC, the receive signal path can include two low-pass analog filters. After the ADC, the receive signal path can include three digital filters with fixed coefficients (HB3/DEC3, HB2, HB1) followed by a programmable poly-phase FIR filter (PROG Rx FIR). The FIR filter can be decimated by a factor of 1, 2 or 4, or the FIR filter can be bypassed if not needed. In one example, an SDF module may only include the Rx signal path.

FIG. 6B illustrates an example of a transmit (Tx) (or output) signal path of a software-defined filtering module. The transmit signal path can include a PROG Tx FIR, first half-band filter (HB1), second half-band filter (HB2), third half-band filter with a fixed coefficient (HB3/INT3), digital-to-analog converter (DAC), BB LPF and a second LPF. Other types of filtering can also be used. In one example, an SDF module may only include the Tx signal path.

In this example, the digital and analog paths can be separated by the DAC. Before the DAC, the transmit signal path can include four digital filters. The first digital filter (PROG Tx FIR) can be a programmable poly-phase FIR filter, which can interpolate by a factor of 1, 2 or 4, or the FIR filter can be bypassed if not needed. The other digital filters (LB1, HB2, HB3 and INT3) can have fixed coefficients, and can be turned on or turned off. After the DAC, the transmit signal path can include two low-pass analog filters.

In one example, the receive and transmit filter banks can be cascaded to create a total SDF response. Further, multiple categories of digital filtering can be used, such as recursive and/or non-recursive filtering (e.g., IIR and FIR, respectively) after the ADC and before the DAC in the receive signal path and the transmit signal path. Further, receive and transmit filtering can be used on an SDR circuit for booster path selectivity.

Figure 7:
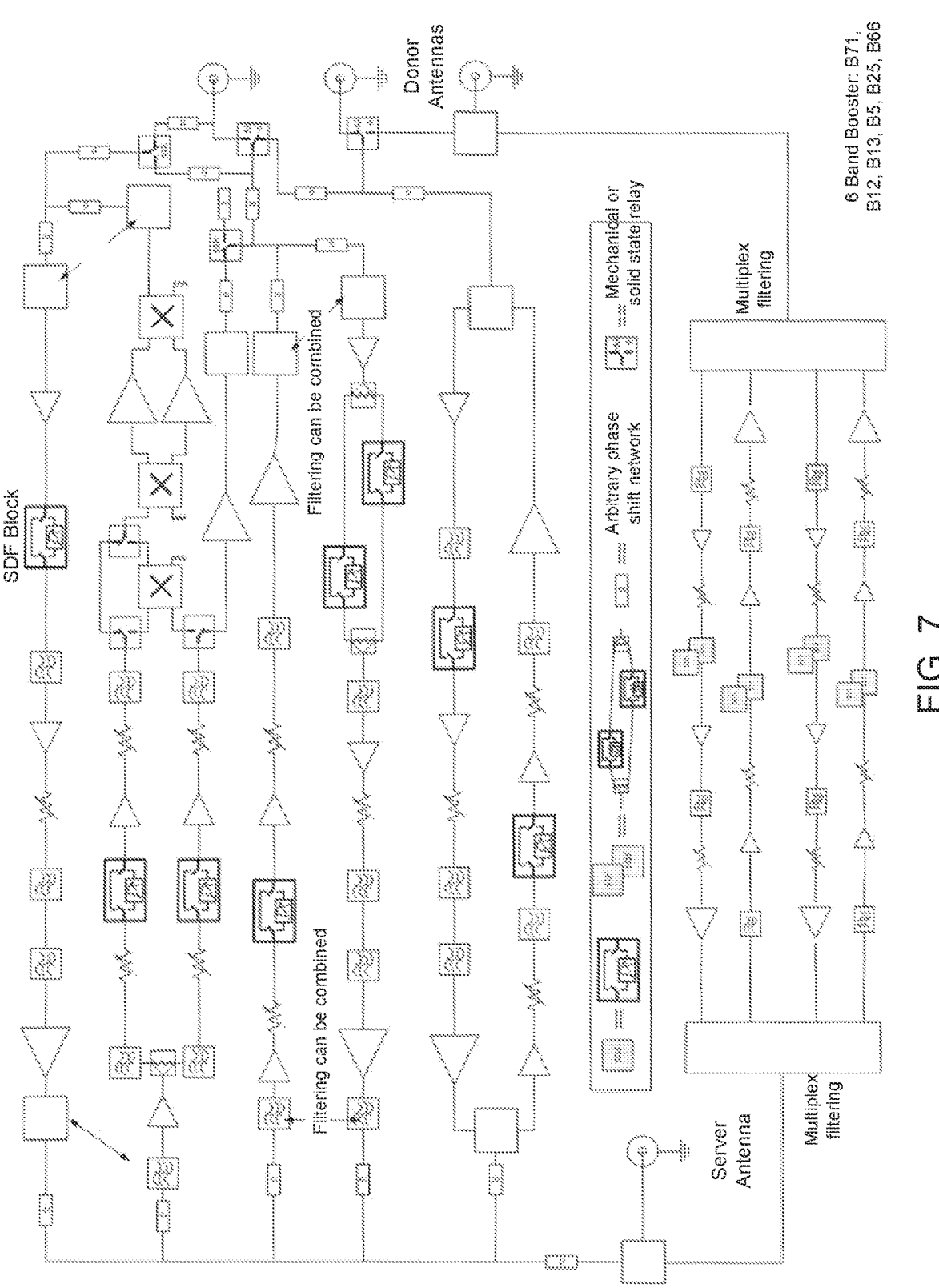
FIG. 7 illustrates a repeater that uses software-defined filtering for multiple bands in accordance with an example.

FIG. 7 illustrates an example of a repeater that uses software-defined filtering for multiple bands. In this example, the repeater can be a six-band repeater. For example, the repeater can amplify and filter signals in band 71 (B71), band 12 (B12), band 13 (B13), band 5 (B5), band 25 (B25) and band 66 (B66). Further, in this example, the repeater can include one, two or three donor antenna ports, and the repeater can include one server port.

In the example shown in FIG. 7, one or more or every signal path can include a separate software-defined filtering (SDF) module or SDF block. For example, a B71 DL signal path can include an SDF module, a B5 UL signal path can include a separate SDF module, and so on. In some cases, the SDF modules can be bypassable (i.e., digital filtering in the SDF module can be bypassed). Further, multiple SDF modules can be used on any of the signal paths to provide non-contiguous band filtering. For example, multiple SDF modules can be used on B12/13 signal paths and on high band signal paths.

In one configuration, a separate SDF module can be used per signal chain or analog signal path. For example, a separate SDF module can be used for each downlink signal path and a separate SDF module can be used for each uplink signal path. A given SDF module can down-convert, digitally filter and up-convert for one signal path. As an example, a five-band repeater can include ten SDF modules (e.g., five SDF modules for five uplink signal paths and five SDF modules for five downlink signal paths). In contrast, a typical digital repeater would use a single FPGA or DSP for digital filtering on all bands.

Figure 8:
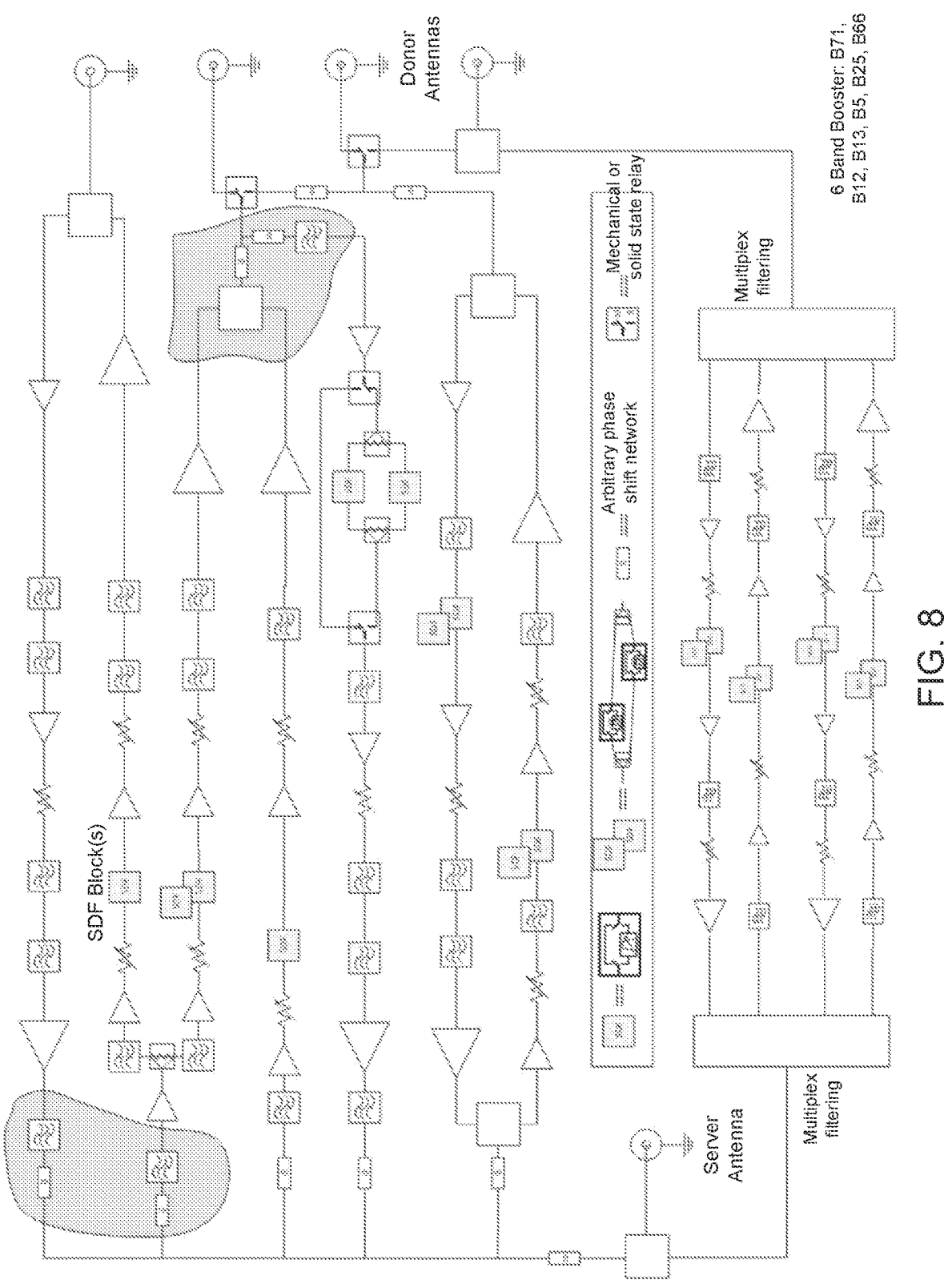
FIG. 8 illustrates a repeater that uses software-defined filtering for multiple bands in accordance with an example.

FIG. 8 illustrates another example of a repeater that uses software-defined filtering for multiple bands. In this example, the repeater can be a six-band repeater. For example, the repeater can amplify and filter signals in band 71 (B71), band 12 (B12), band 13 (B13), band 5 (B5), band 25 (B25) and band 66 (B66). Further, in this example, the repeater can include two, three or four donor antenna ports, and the repeater can include one server port.

In the example shown in FIG. 8, one or more signal paths can include one or more SDF modules or SDF blocks. For example, multiple SDF modules can be used on the B12 UL and B5 UL/DL signal paths. Further, in this example, multiple SDF modules can be bypassed on the B12/13 DL signal path, where a bypass can be applicable to single or multiple SDF modules on a given signal path.

Figure 9:
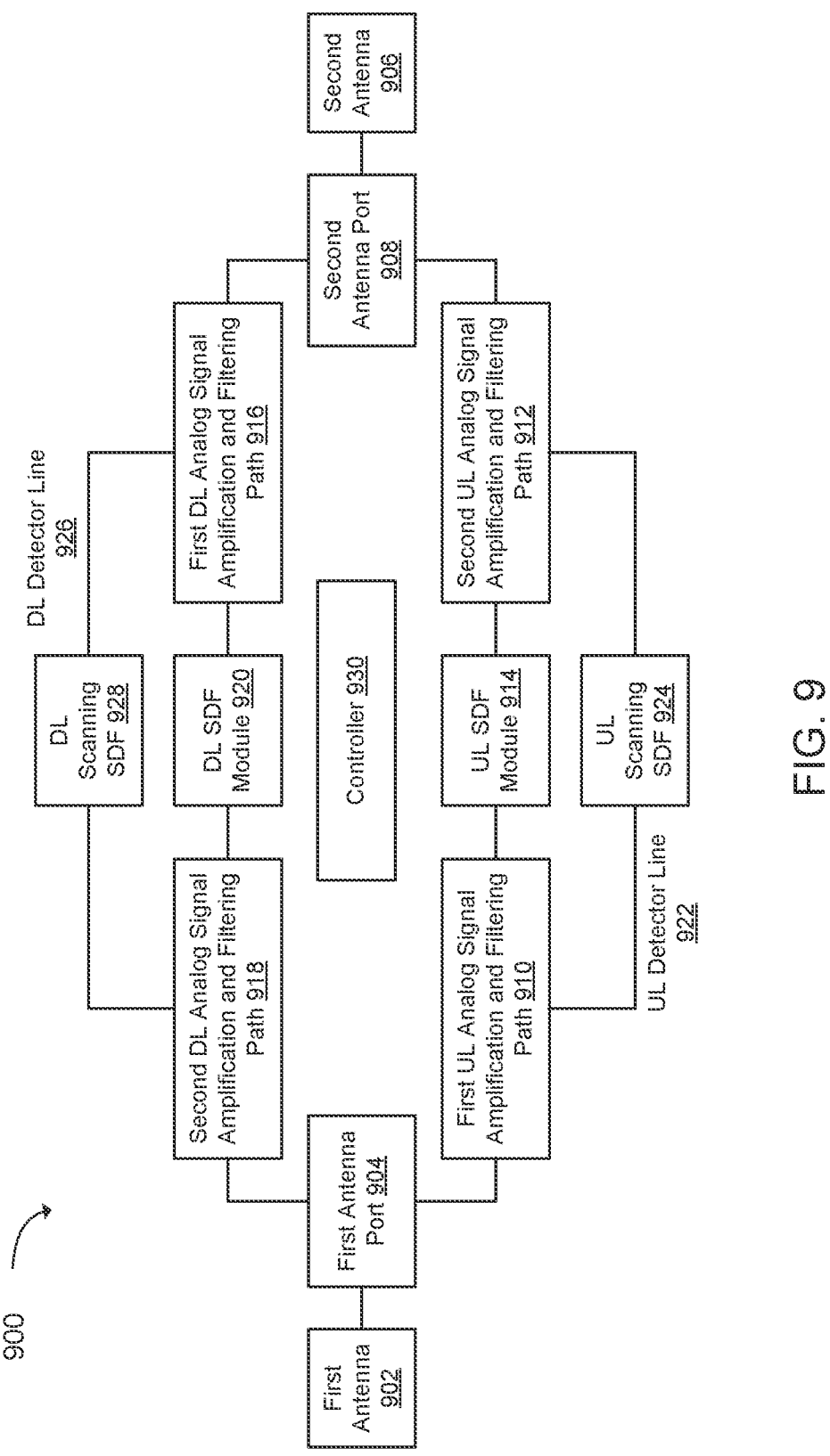
FIG. 9 illustrates a repeater that includes software-defined filtering in accordance with an example.

FIG. 9 illustrates an example of a repeater 900. The repeater 900 can include a first antenna port 904 and a second antenna port 908. The repeater 900 can include a first uplink analog signal amplification and filtering path 910 associated with an uplink frequency range and communicatively coupled to the first antenna port 904. The repeater 900 can include a second uplink analog signal amplification and filtering path 912 associated with the uplink frequency range and communicatively coupled to the second antenna port 908. The repeater 900 can include a first downlink analog signal amplification and filtering path 916 associated with a downlink frequency range and communicatively coupled to the second antenna port 908. The repeater 900 can include a second downlink analog signal amplification and filtering path 918 associated with the downlink frequency range and communicatively coupled to the first antenna port 904. Further, the repeater 900 can include an uplink software-defined filtering (SDF) module 914 communicatively coupled between the first uplink analog signal amplification and filtering path 910 and the second uplink analog signal amplification and filtering path 912. The uplink SDF module 914 can include digital filtering at or near baseband and is operable to create a dynamically adjustable passband for a plurality of uplink frequency ranges. Further, the repeater 900 can include a downlink SDF module 920 communicatively coupled between the first downlink analog signal amplification and filtering path 916 and the second downlink analog signal amplification and filtering path 918. The downlink SDF module 920 can include digital filtering at or near baseband and is operable to create a dynamically adjustable passband for a plurality of downlink frequency ranges.

In one example, the uplink analog signal can be a frequency division duplex (FDD) signal or a time division duplex (TDD) signal. In addition, the downlink analog signal can be a FDD signal or a TDD signal.

In one example, the repeater 900 can include a controller 930. The controller 930 can determine a power measurement of a downlink analog signal for a downlink frequency range in the plurality of downlink frequency ranges. The power measurement can be received from the downlink SDF module 920 or the power measurement can be received from an external circuit (not shown) that performs the power measurement of the downlink analog signal. The controller 930 can determine, for network protection, an automatic gain control (AGC) level for an uplink analog signal based on the power measurement of the downlink analog signal. The controller 930 can apply the AGC level to the uplink analog signal.

In one example, the controller 930 can determine a power measurement of an uplink analog signal for an uplink frequency range in the plurality of uplink frequency ranges. The power measurement can be received from the uplink SDF module 914 or the power measurement can be received from an external circuit (not shown) that performs the power measurement of the uplink analog signal. The controller 930 can determine an automatic gain control (AGC) level for the uplink analog signal based on the power measurement of the uplink analog signal. The controller 930 can apply the AGC level to the uplink analog signal.

In one example, the dynamically adjustable passband can be for the plurality of uplink frequency ranges, and the controller 930 can be configured to determine automatic gain control (AGC) levels for the plurality of uplink frequency ranges on a per-frequency range basis by adjusting the dynamically adjustable passband created using the uplink SDF module 914. In another example, the dynamically adjustable passband can be for the plurality of downlink frequency ranges, and the controller 930 can be configured to determine automatic gain control (AGC) levels for the plurality of downlink frequency ranges on a per-frequency range basis by adjusting the dynamically adjustable passband created using the downlink SDF module 920. Further, the plurality of uplink frequency ranges can be uplink channels and the plurality of downlink frequency ranges can be downlink channels.

In one example, the controller 930 can create a dynamically adjustable passband for a subset of the downlink frequency range based on a received carrier signal in a downlink.

In one example, the repeater 900 can include an uplink detector line 922 communicatively coupled to the first uplink analog signal amplification and filtering path 910 and the second uplink analog signal amplification and filtering path 912. The uplink detector line 922 can include an uplink scanning SDF module 924 to monitor and measure a power level of at least one of the plurality of uplink frequency ranges. In another example, the repeater 900 can include a downlink detector line 926 communicatively coupled to the first downlink analog signal amplification and filtering path 916 and the second downlink analog signal amplification and filtering path 918. The downlink detector line 926 can include a downlink scanning SDF module 928 to monitor and measure a power level of at least one of the plurality of downlink frequency ranges.

In one example, the uplink SDF module 914 can be communicatively coupled to a plurality of uplink analog signal amplification and filtering paths between the first antenna port 904 and the second antenna port 908, and the uplink SDF module 914 can be switched in for use with a given uplink analog signal amplification and filtering path. In another example, the downlink SDF module 920 can be communicatively coupled to a plurality of downlink analog signal amplification and filtering paths between the first antenna port 904 and the second antenna port 908, and the downlink SDF module 920 can be switched in for use with a given downlink analog signal amplification and filtering path.

As an example, a single SDF module can be coupled to multiple signal paths and can be switched in and out, in order to monitor one signal path at a time. For example, in a repeater having ten detector lines, one SDF module can be switched in for all ten detector lines of the repeater.

In one example, the uplink SDF module 914 can include a pass through path to bypass the digital filtering of the uplink SDF module 914. Further, the downlink SDF module 920 can include a pass through path to bypass the digital filtering of the downlink SDF module 920.

In one example, the controller 930 can determine a signal metric of the downlink analog signal. The controller 930 can apply a network protection based on the signal metric. The signal metric can include a reference signal received power (RSRP), reference signal received quality (RSRQ), received signal strength indicator (RSSI), channel quality indicator (CQI), signal-to-noise ratio (SNR) and/or signal to interference plus noise ratio (SINR).

In one example, the first antenna port 904 can be coupled to a first antenna 902, and the second antenna port 908 can be coupled to a second antenna 906. In one example, the first antenna 902 can be a server antenna and the second antenna 906 can be a donor antenna. Further, the first antenna 902 (e.g., server antenna) or the second antenna 906 (e.g., donor antenna) can be electrically or mechanically steerable antennas that receive and amplify analog signals based on carriers associated with the analog signals, where the antennas are auto-steerable and directed based on detected signal levels or signal qualities of the received analog signals.

In one example, the uplink SDF module 914 and the downlink SDF module 920 can each include an input path and an output path. The input path or the output path can include a digital signal processor (DSP), a digital-to-analog converter (DAC), an analog-to-digital converter (ADC), a gain block, a multiplexer, a demultiplexer, a log power detector, a power amplifier and/or one or more digital filters or one or more analog filters. Further, the one or more digital filters can include an infinite impulse response (IIR) filter and/or a finite impulse response (FIR) filter.

Figure 10:
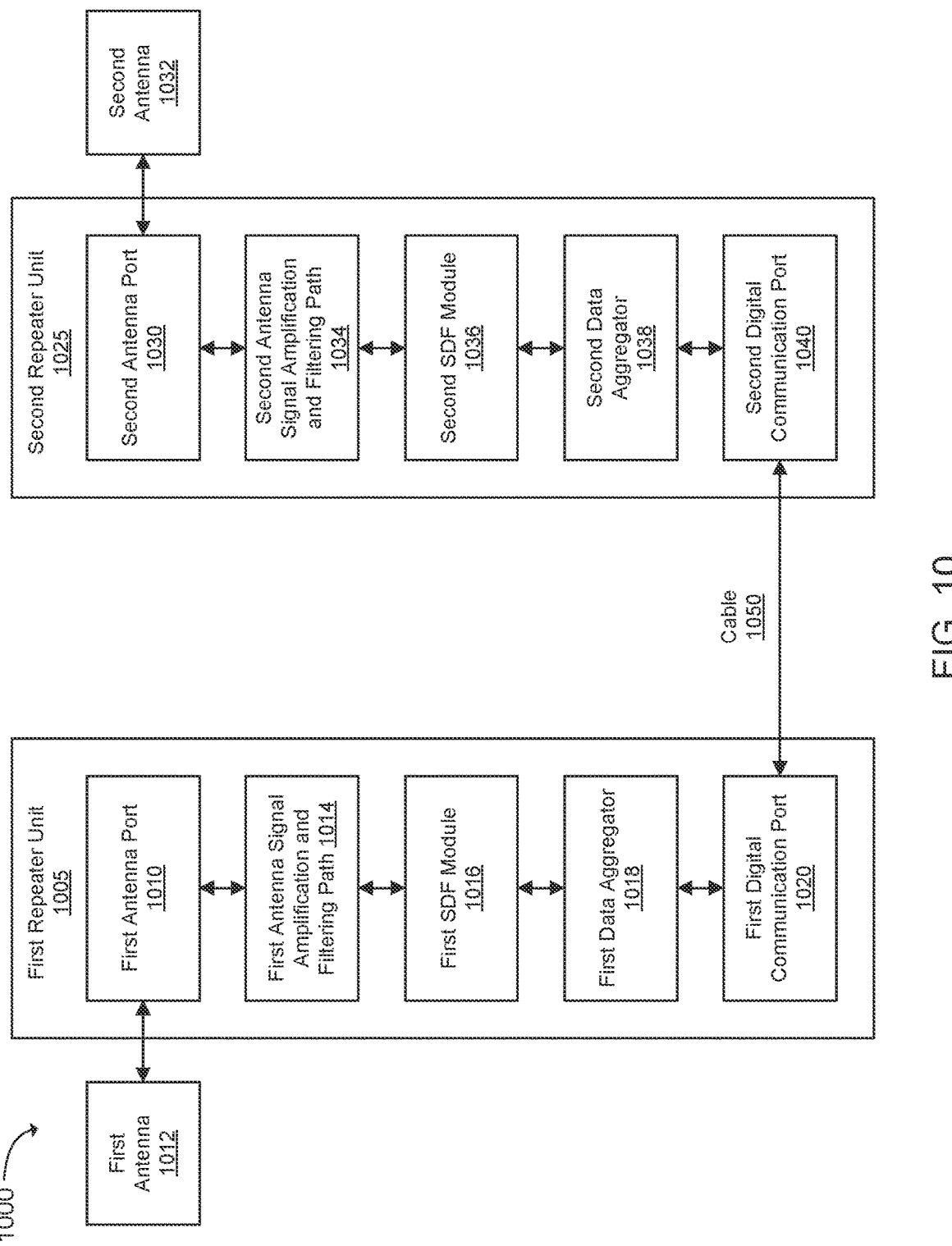
FIG. 10 illustrates a digital repeater system in accordance with an example.

FIG. 10 illustrates an example of a digital repeater system 1000. The digital repeater system 100 can include a first repeater unit 1005 and a second repeater unit 1025. The first repeater unit 1005 can be a main repeater unit and the second repeater unit 1025 can be an in-line repeater unit, or vice versa. The first repeater unit 1005 can include a first antenna port 1010 operable to receive a radio frequency (RF) analog signal. The RF analog signal can be received in an uplink or a downlink. The first antenna port 1010 can be coupled to a first antenna 1012. The first repeater unit 1005 can include a first analog signal amplification and filtering path 1014 communicatively coupled to the first antenna port 1010. The first analog signal amplification and filtering path 1014 can receive the RF analog signal from the first antenna port 1010. The first repeater unit 1005 can include a first software-defined filtering (SDF) module 1016 to receive the RF analog signal from the first analog signal amplification and filtering path 1014 and convert the RF analog signal to digital baseband data. The first repeater unit 1005 can include a first digital communication port 1020 to transmit the digital baseband data.

Further, the second repeater unit 1025 can include a second digital communication port 1040 to receive the digital baseband data from the first digital communication port 1020 of the first repeater unit 1005. The second repeater unit 1025 can include a second SDF module 1036 communicatively coupled to the second digital communication port 1040. The second SDF module 1036 can be configured to convert the digital baseband data to a repeated RF analog signal. The second repeater unit 1025 can include a second analog signal amplification and filtering path 1034 communicatively coupled to the second SDF module 1036. The second analog signal amplification and filtering path 1034 can be configured to receive the repeated RF analog signal from the second SDF module 1036. The second repeater unit 1025 can include a second antenna port 1030 configured to transmit the repeated RF analog signal via a second antenna 1032 coupled to the second antenna port 1030.

In one example, the digital repeater system 1000 can include a cable 1050 communicatively coupled between the first digital communication port 1020 and the second digital communication port 1040 to communicate the digital baseband data from the first repeater unit 1005 to the second repeater unit 1025. The cable 1050 can be a fiber-optic cable or a Category (Cat) 5/6/7/8 twisted pair cable. In another example, the first repeater unit 1005 can be configured to communicate with the second repeater unit 1025 using one or more powerline Ethernet adapters.

In one example, the first repeater unit 1005 can include a first data aggregator 1018 between the first SDF module 1016 and the first digital communication port 1020. The first data aggregator 1018 can combine multiple signal paths corresponding to multiple frequency ranges. Further, the second repeater unit 1025 can include a second data aggregator 1038 between the second SDF module 1036 and the second digital communication port 1040. The second data aggregator 1038 can combine multiple signal paths corresponding to multiple frequency ranges.

In one example, the first and second data aggregators 1018, 1038 can be useful when there are multiple bands (or frequency ranges or channels) in the first repeater unit 1005 and the second repeater unit 1025, respectively. For example, multiple uplink and downlink bands can be combined together in the first and second data aggregators 1018, 1038, and can be outputted on one digital line.

In one example, the digital repeater system 1000 can include a plurality of additional repeater units located in proximity to the first antenna port 1010 or the second antenna port 1030, where the first antenna port 1010 or the second antenna port 1030 is a server antenna port. The additional repeater units can be used to split or separate digital signals with no or minimal degradation.

In another example, the first SDF module 1016 and/or the second SDF module 1036 may not apply digital filtering and can be used for signal digitization. In this case, Ethernet, fiber optic, powerline Ethernet, or other mechanisms can be used where channelization and digital filtering are not required.

Figure 11:
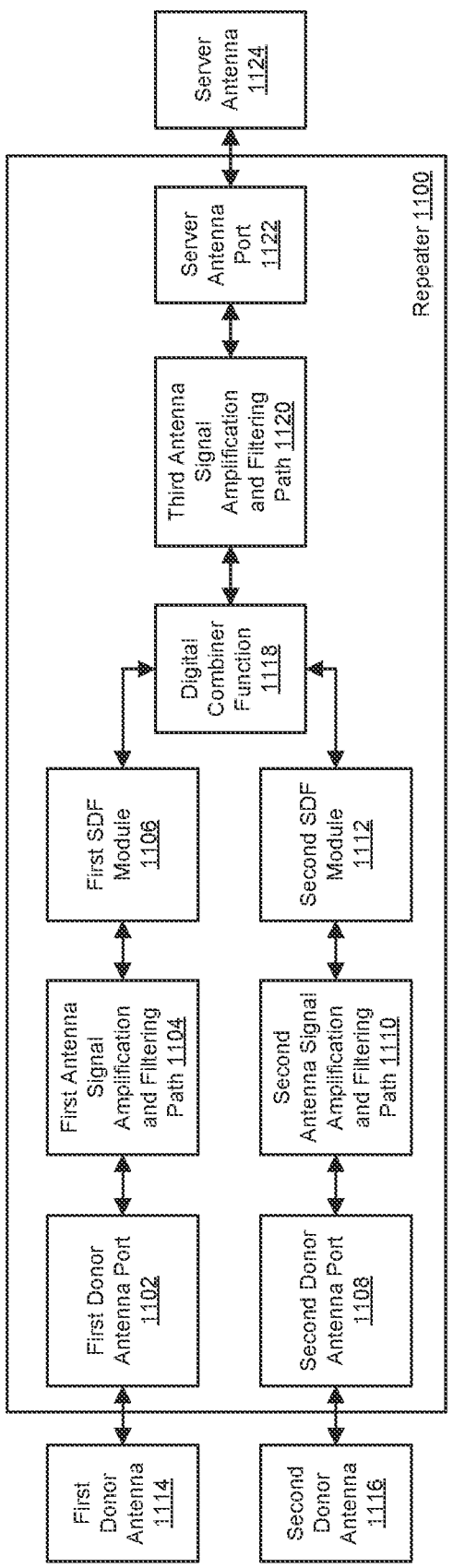
FIG. 11 illustrates a repeater that uses software-defined filtering and combines multiple received donor signals in accordance with an example.

FIG. 11 illustrates an example of a repeater 1100. The repeater 1100 can include a first donor antenna port 1102 configured to receive a first downlink analog signal. The repeater 1100 can include a second donor antenna port 1108 configured to receive a second downlink analog signal. The first donor antenna port 1102 can be coupled to a first donor antenna 1114 and the second donor antenna port 1108 can be coupled to a second donor antenna 1116. The repeater 1100 can further include a server antenna port 1122 coupled to a server antenna 1124. Further, the repeater 1100 can include a first analog signal amplification and filtering path 1104 communicatively coupled to the first donor antenna port 1102, a second analog signal amplification and filtering path 1110 communicatively coupled to the second donor antenna port 1108, and a third analog signal amplification and filtering path 1120 communicatively coupled to the server antenna port 1122.

In one example, the repeater 1100 can include a first software-defined filtering (SDF) module 1106 communicatively coupled to the first analog signal amplification and filtering path 1104. The first SDF module 1106 can be operable to convert the first downlink analog signal to first digital baseband data. The repeater 1100 can include a second SDF module 1112 communicatively coupled to the second analog signal amplification and filtering path 1110. The second SDF module 1112 can be operable to convert the second downlink analog signal to second digital baseband data.

In one example, the repeater 1100 can include a digital combiner function 1118 communicatively coupled between the first SDF module 1106, the second SDF module 1112 and the third analog signal amplification and filtering path 1120. In one example, the first SDF module 1106 and the second SDF module 1112 can be analog combined on their outputs. The digital combiner function 1118 can be operable to digitally combine the first digital baseband data and the second digital baseband data to form a single downlink signal. The single downlink signal (or combined digital signal) can be up-converted to RF, and another SDF module (now shown) can be used to perform the conversion. In addition, the third analog signal amplification and filtering path 1120 can be configured to convert the single downlink signal to a repeated downlink analog signal for transmission via the server antenna port 1122.

In one example, the first SDF module 1106, the second SDF module 1112 and/or the digital combiner 1118 can be operable to add delays or gain adjustments to the first downlink analog signal or the second downlink analog signal to create or account for delay spread. In another example, the second SDF module 1112 and/or the digital combiner 1118 can be operable to apply multiple-input multiple-output (MIMO) techniques including maximal ratio combining to the first downlink analog signal or the second downlink analog signal. Other diversity combining techniques can be used, such as equal-gain combining, switched combining or selection combining. In yet another example, the first SDF module 1106 and/or the second SDF module 1112 can be operable to create or offset an effect of one or more fading paths.

Figure 12:
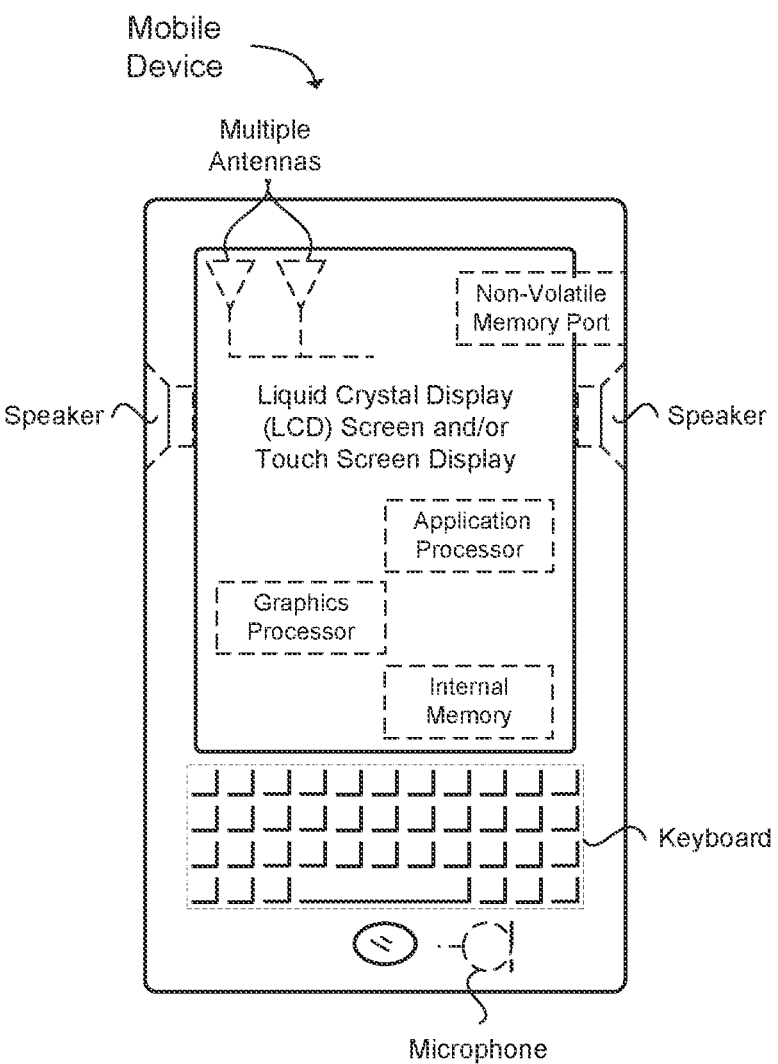
FIG. 12 illustrates a wireless device in accordance with an example.

FIG. 12 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, comprising: a first antenna port; a second antenna port; a first uplink analog signal amplification and filtering path associated with an uplink frequency range and communicatively coupled to the first antenna port; a second uplink analog signal amplification and filtering path associated with the uplink frequency range and communicatively coupled to the second antenna port; a first downlink analog signal amplification and filtering path associated with a downlink frequency range and communicatively coupled to the second antenna port; a second downlink analog signal amplification and filtering path associated with the downlink frequency range and communicatively coupled to the first antenna port; an uplink software-defined filtering (SDF) module communicatively coupled between the first uplink analog signal amplification and filtering path and the second uplink analog signal amplification and filtering path, wherein the uplink SDF module includes digital filtering at or near baseband and is operable to create a dynamically adjustable passband for a plurality of uplink frequency ranges; and a downlink SDF module communicatively coupled between the first downlink analog signal amplification and filtering path and the second downlink analog signal amplification and filtering path, wherein the downlink SDF module includes digital filtering at or near baseband and is operable to create a dynamically adjustable passband for a plurality of downlink frequency ranges.

Example 2 includes the repeater of Example 1, wherein: the uplink analog signal is a frequency division duplex (FDD) signal or a time division duplex (TDD) signal; and the downlink analog signal is a FDD signal or a TDD signal.

Example 3 includes the repeater of any of Examples 1 to 2, further comprising a controller configured to: determine a power measurement of a downlink analog signal for a downlink frequency range in the plurality of downlink frequency ranges, wherein the power measurement is received from the downlink SDF module or the power measurement is received from an external circuit that performs the power measurement of the downlink analog signal; determine, for network protection, an automatic gain control (AGC) level for an uplink analog signal based on the power measurement of the downlink analog signal; and apply the AGC level to the uplink analog signal.

Example 4 includes the repeater of any of Examples 1 to 3, further comprising a controller configured to: determine a power measurement of an uplink analog signal for an uplink frequency range in the plurality of uplink frequency ranges, wherein the power measurement is received from the uplink SDF module or the power measurement is received from an external circuit that performs the power measurement of the uplink analog signal; determine an automatic gain control (AGC) level for the uplink analog signal based on the power measurement of the uplink analog signal; and apply the AGC level to the uplink analog signal.

Example 5 includes the repeater of any of Examples 1 to 4, wherein: the dynamically adjustable passband is for the plurality of uplink frequency ranges, and the controller is configured to determine automatic gain control (AGC) levels for the plurality of uplink frequency ranges on a per-frequency range basis by adjusting the dynamically adjustable passband created using the uplink SDF module; and the dynamically adjustable passband is for the plurality of downlink frequency ranges, and the controller is configured to determine automatic gain control (AGC) levels for the plurality of downlink frequency ranges on a per-frequency range basis by adjusting the dynamically adjustable passband created using the downlink SDF module, wherein the plurality of uplink frequency ranges are uplink channels and the plurality of downlink frequency ranges are downlink channels.

Example 6 includes the repeater of any of Examples 1 to 5, wherein the controller is further configured to: create a dynamically adjustable passband for a subset of the downlink frequency range based on a received carrier signal in a downlink.

Example 7 includes the repeater of any of Examples 1 to 6, further comprising: an uplink detector line communicatively coupled to the first uplink analog signal amplification and filtering path and the second uplink analog signal amplification and filtering path, wherein the uplink detector line includes an uplink scanning SDF module to monitor and measure a power level of at least one of the plurality of uplink frequency ranges; and a downlink detector line communicatively coupled to the first downlink analog signal amplification and filtering path and the second downlink analog signal amplification and filtering path, wherein the downlink detector line includes a downlink scanning SDF module to monitor and measure a power level of at least one of the plurality of downlink frequency ranges.

Example 8 includes the repeater of any of Examples 1 to 7, wherein: the uplink SDF module is configured to be communicatively coupled to a plurality of uplink analog signal amplification and filtering paths between the first antenna port and the second antenna port, wherein the uplink SDF module is switched in for use with a given uplink analog signal amplification and filtering path; and the downlink SDF module is configured to be communicatively coupled to a plurality of downlink analog signal amplification and filtering paths between the first antenna port and the second antenna port, wherein the downlink SDF module is switched in for use with a given downlink analog signal amplification and filtering path.

Example 9 includes the repeater of any of Examples 1 to 8, further comprising: an uplink pass through path to bypass the digital filtering of the uplink SDF module; and a downlink pass through path to bypass the digital filtering of the downlink SDF module.

Example 10 includes the repeater of any of Examples 1 to 2, wherein the controller is configured to: determine a signal metric of the downlink analog signal; and apply a network protection based on the signal metric, wherein the signal metric is one or more of: a reference signal received power (RSRP), reference signal received quality (RSRQ), received signal strength indicator (RSSI), channel quality indicator (CQI), signal-to-noise ratio (SNR) or signal to interference plus noise ratio (SINR).

Example 11 includes the repeater of any of Examples 1 to 10, wherein the first antenna port is communicatively coupled to a server antenna and the second antenna port is communicatively coupled to a donor antenna.

Example 12 includes the repeater of any of Examples 1 to 11, wherein the server antenna or the donor antenna are electrically or mechanically steerable antennas that receive and amplify analog signals based on carriers associated with the analog signals, wherein the antennas are auto-steerable and directed based on detected signal levels or signal qualities of the received analog signals.

Example 13 includes the repeater of any of Examples 1 to 12, wherein the uplink SDF module and the downlink SDF module each include an input path and an output path, and wherein the uplink SDF module and the downlink SDF module each include one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

Example 14 includes the repeater of any of Examples 1 to 13, wherein the one or more digital filters include one or more of an infinite impulse response (IIR) filter or a finite impulse response (FIR) filter.

Example 15 includes the repeater of any of Examples 1 to 14, further comprising a controller configured to disable or enable one or more uplink frequency ranges or downlink frequency ranges on a carrier-specific basis.

Example 16 includes a digital repeater system, comprising: a first repeater unit, comprising: a first antenna port operable to receive a radio frequency (RF) analog signal; a first analog signal amplification and filtering path communicatively coupled to the first antenna port, wherein the first analog signal amplification and filtering path is configured to receive the RF analog signal from the first antenna port; a first software-defined filtering (SDF) module configured to receive the RF analog signal from the first analog signal amplification and filtering path and convert the RF analog signal to digital baseband data; and a first digital communication port configured to transmit the digital baseband data; a second repeater unit, comprising: a second digital communication port configured to receive the digital baseband data; a second SDF module communicatively coupled to the second digital communication port, wherein the second SDF module is configured to convert the digital baseband data to a repeated RF analog signal; a second analog signal amplification and filtering path communicatively coupled to the second SDF module, wherein the second analog signal amplification and filtering path is configured to receive the repeated RF analog signal from the second SDF module; and a second antenna port configured to transmit the repeated RF analog signal; and a cable communicatively coupled between the first digital communication port and the second digital communication port to communicate the digital baseband data from the first repeater unit to the second repeater unit.

Example 17 includes the digital repeater system of Example 16, wherein the first repeater unit is configured to communicate with the second repeater unit using one or more powerline Ethernet adapters.

Example 18 includes the digital repeater system of any of Examples 16 to 17, wherein the RF analog signal is received in an uplink or a downlink.

Example 19 includes the digital repeater system of any of Examples 16 to 18, wherein the first repeater unit is a main repeater unit and the second repeater unit is an in-line repeater unit, or vice versa.

Example 20 includes the digital repeater system of any of Examples 16 to 19, wherein: the first repeater unit includes a data aggregator between the first SDF module and the first digital communication port, wherein the first data aggregator is configured to combine multiple signal paths corresponding to multiple frequency ranges; and the second repeater unit includes a data de-aggregator between the second SDF module and the second digital communication port, wherein the second data aggregator is configured to combine multiple signal paths corresponding to multiple frequency ranges.

Example 21 includes the digital repeater system of any of Examples 16 to 20, wherein the cable is one of a fiber-optic cable or a Category (Cat) 5/6/7/8 twisted pair cable.

Example 22 includes the digital repeater system of any of Examples 16 to 21, wherein the first SDF module and the second SDF module each include an input path and an output path, and wherein the first SDF module and the second SDF module each include one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

Example 23 includes the digital repeater system of any of Examples 16 to 22, wherein the one or more digital filters include one or more of an infinite impulse response (IIR) filter or a finite impulse response (FIR) filter.

Example 24 includes the digital repeater system of any of Examples 16 to 23, further comprising a plurality of additional repeater units located in proximity to the first antenna port or the second antenna port, wherein the first antenna port or the second antenna port is a server antenna port, and wherein the additional repeater units are used to split a digital signal with no or minimal degradation.

Example 25 includes the digital repeater system of any of Examples 16 to 24, wherein one or more of the first SDF module or the second SDF module are configured to not apply digital filtering and are used for signal digitization.

Example 26 includes a repeater, comprising: a first donor antenna port configured to receive a first downlink analog signal; a second donor antenna port configured to receive a second downlink analog signal; a server antenna port; a first analog signal amplification and filtering path communicatively coupled to the first donor antenna port; a second analog signal amplification and filtering path communicatively coupled to the second donor antenna port; a third analog signal amplification and filtering path communicatively coupled to the server antenna port; a first software-defined filtering (SDF) module communicatively coupled to the first analog signal amplification and filtering path, wherein the first SDF module is operable to convert the first downlink analog signal to first digital baseband data; a second SDF module communicatively coupled to the second analog signal amplification and filtering path, wherein the second SDF module is operable to convert the second downlink analog signal to second digital baseband data; and a digital combiner function communicatively coupled between the first SDF module, the second SDF module and the third analog signal amplification and filtering path, wherein the digital combiner function is operable to digitally combine the first digital baseband data and the second digital baseband data to form a single downlink signal.

Example 27 includes the repeater of Example 26, wherein the single downlink signal is converted to a repeated downlink analog signal and directed through the third analog signal amplification and filtering path for transmission via the server antenna port.

Example 28 includes the repeater of any of Examples 26 to 27, wherein at least one of the first SDF module, the second SDF module or the digital combiner are operable to add one or more of: delays, gain adjustments or digital filter adjustments to the first downlink analog signal or the second downlink analog signal to create or account for delay spread.

Example 29 includes the repeater of any of Examples 26 to 28, wherein at least one of the first SDF module, the second SDF module or the digital combiner are operable to apply one or more techniques that enhance multiple-input multiple-output (MIMO) reception of the UE, wherein the one or more techniques include one or more of: path diversity selection, delay diversity, or maximal ratio combining to the first downlink analog signal or the second downlink analog signal.

Example 30 includes the repeater of any of Examples 26 to 29, wherein the first SDF module and the second SDF module are operable to offset or mitigate an effect of one or more fading paths.

Example 31 includes the repeater of any of Examples 26 to 30, wherein the first SDF module and the second SDF module each include an input path and an output path, and wherein the first SDF module and the second SDF module each include one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

Example 32 includes the repeater of any of Examples 26 to 31, wherein the one or more digital filters include one or more of an infinite impulse response (IIR) filter or a finite impulse response (FIR) filter.

Example 33 includes the repeater of any of Examples 26 to 32, wherein the first donor antenna port and the second donor antenna port are included in a plurality of N donor antenna ports of the repeater, wherein N is a positive integer.

Example 34 includes a repeater, comprising: a first antenna port; a second antenna port; a first first-direction analog signal amplification and filtering path associated with a first-direction frequency range and communicatively coupled to the first antenna port; a second first-direction analog signal amplification and filtering path associated with the first-direction frequency range and communicatively coupled to the second antenna port; a first-direction software-defined filtering (SDF) module communicatively coupled between the first first-direction analog signal amplification and filtering path and the second first-direction analog signal amplification and filtering path; a first second-direction analog signal amplification and filtering path associated with a second-direction frequency range and communicatively coupled to the first antenna port; a second second-direction analog signal amplification and filtering path associated with the second-direction frequency range and communicatively coupled to the second antenna port; and a second-direction SDF module communicatively coupled between the first second-direction analog signal amplification and filtering path and the second second-direction analog signal amplification and filtering path.

Example 35 includes the repeater of Example 34, wherein the first-direction is an uplink direction and the second-direction is a downlink direction.

Example 36 includes the repeater of any of Examples 34 to 35, wherein: the first-direction SDF module includes digital filtering at or near baseband and is operable to create a dynamically adjustable passband for a plurality of first-direction frequency ranges; and the second-direction SDF module includes digital filtering at or near baseband and is operable to create a dynamically adjustable passband for a plurality of second-direction frequency ranges.

Example 37 includes the repeater of any of Examples 34 to 36, wherein the plurality of first-direction frequency ranges includes a band 12 (B12) uplink frequency range to carry a B12 uplink signal and a band 13 (B13) uplink frequency range to carry a B13 uplink signal on one of the first first-direction analog signal amplification and filtering path or the second first-direction analog signal amplification and filtering path, and the plurality of second-direction frequency ranges includes a B12/613 downlink frequency range to carry a B12/613 downlink signal on one of the first second-direction analog signal amplification and filtering path or the second second-direction analog signal amplification and filtering path.

Example 38 includes the repeater of any of Examples 34 to 37, wherein the first-direction SDF module and the second-direction SDF module each include an input path and an output path, and wherein the first-direction SDF module and the second-direction SDF module each include one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

Example 38 includes the repeater of any of Examples 34 to 38, further comprising a second SDF module in one or more of amplification and filtering paths comprising: the first first-direction analog signal amplification and filtering path; or the second first-direction analog signal amplification and filtering path; or the first second-direction analog signal amplification and filtering path; or the second second-direction analog signal amplification and filtering path, wherein the first-direction SDF module and the second-direction SDF module are configured to down-convert, digitally filter, and up-convert a first signal in a first band; and the second SDF module is configured to down-convert, digitally filter, and up-convert a second signal in a second band on the one or more amplification and filtering paths. The second SDF module includes an input path and an output path, and one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:

a first antenna port;

a second antenna port;

a first uplink analog signal amplification and filtering path associated with an uplink frequency range and communicatively coupled to the first antenna port;

a second uplink analog signal amplification and filtering path associated with the uplink frequency range and communicatively coupled to the second antenna port;

a first downlink analog signal amplification and filtering path associated with a downlink frequency range and communicatively coupled to the second antenna port;

a second downlink analog signal amplification and filtering path associated with the downlink frequency range and communicatively coupled to the first antenna port;

an software-defined filtering (SDF) communicatively coupled between the first uplink analog signal amplification and filtering path and the second uplink analog signal amplification and filtering path, wherein the SDF includes digital filtering at or near baseband and is operable to create a dynamically adjustable passband for a plurality of uplink frequency ranges; and the SDF communicatively coupled between the first downlink analog signal amplification and filtering path and the second downlink analog signal amplification and filtering path, wherein the SDF includes digital filtering at or near baseband and is operable to create a dynamically adjustable passband for a plurality of downlink frequency ranges; and a controller configured to:

determine a power measurement of a downlink analog signal for a downlink frequency range in the plurality of downlink frequency ranges, wherein the power measurement is received from the SDF or the power measurement is received from an external circuit that performs the power measurement of the downlink analog signal;

determine, for network protection, an automatic gain control (AGC) level for an uplink analog signal based on the power measurement of the downlink analog signal; and apply the AGC level to the uplink analog signal.

2. The repeater of claim 1, wherein:

the uplink analog signal is a frequency division duplex (FDD) signal or a time division duplex (TDD) signal; and the downlink analog signal is a FDD signal or a TDD signal.

3. The repeater of claim 1, wherein the controller is further configured to:

determine a power measurement of an uplink analog signal for an uplink frequency range in the plurality of uplink frequency ranges, wherein the power measurement is received from the SDF or the power measurement is received from an external circuit that performs the power measurement of the uplink analog signal;

determine an automatic gain control (AGC) level for the uplink analog signal based on the power measurement of the uplink analog signal; and apply the AGC level to the uplink analog signal.

4. The repeater of claim 1, wherein:

the dynamically adjustable passband is for the plurality of uplink frequency ranges, and the controller is configured to determine automatic gain control (AGC) levels for the plurality of uplink frequency ranges on a per-frequency range basis by adjusting the dynamically adjustable passband created using the SDF; and the dynamically adjustable passband is for the plurality of downlink frequency ranges, and the controller is configured to determine automatic gain control (AGC) levels for the plurality of downlink frequency ranges on a per-frequency range basis by adjusting the dynamically adjustable passband created using the SDF, wherein the plurality of uplink frequency ranges are uplink channels and the plurality of downlink frequency ranges are downlink channels.

5. The repeater of claim 1, wherein the controller is further configured to: create a dynamically adjustable passband for a subset of the downlink frequency range based on a received carrier signal in a downlink.

6. The repeater of claim 1, further comprising:

an uplink detector line communicatively coupled to the first uplink analog signal amplification and filtering path and the second uplink analog signal amplification and filtering path, wherein the uplink detector line includes an uplink scanning SDF to monitor and measure a power level of at least one of the plurality of uplink frequency ranges; and a downlink detector line communicatively coupled to the first downlink analog signal amplification and filtering path and the second downlink analog signal amplification and filtering path, wherein the downlink detector line includes a downlink scanning SDF to monitor and measure a power level of at least one of the plurality of downlink frequency ranges.

7. The repeater of claim 1, wherein:

the SDF is configured to be communicatively coupled to a plurality of uplink analog signal amplification and filtering paths between the first antenna port and the second antenna port, wherein the SDF is switched in for use with a given uplink analog signal amplification and filtering path; and the SDF is configured to be communicatively coupled to a plurality of downlink analog signal amplification and filtering paths between the first antenna port and the second antenna port, wherein the SDF is switched in for use with a given downlink analog signal amplification and filtering path.

8. The repeater of claim 1, further comprising:

an uplink pass through path to bypass the digital filtering of the SDF; and a downlink pass through path to bypass the digital filtering of the SDF.

9. The repeater of claim 1, wherein the controller is configured to:

determine a signal metric of the downlink analog signal; and apply a network protection based on the signal metric, wherein the signal metric is one or more of: a reference signal received power (RSRP), reference signal received quality (RSRQ), received signal strength indicator (RSSI), channel quality indicator (CQI), signal-to-noise ratio (SNR) or signal to interference plus noise ratio (SINR).

10. The repeater of claim 1, wherein the first antenna port is communicatively coupled to a server antenna and the second antenna port is communicatively coupled to a donor antenna.

11. The repeater of claim 10, wherein the server antenna or the donor antenna are electrically or mechanically steerable antennas that receive and amplify analog signals based on carriers associated with the analog signals, wherein the antennas are auto-steerable and directed based on detected signal levels or signal qualities of the received analog signals.

12. The repeater of claim 1, wherein the SDF includes an input path and an output path, and wherein the SDF includes one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

13. The repeater of claim 12, wherein the one or more digital filters include one or more of an infinite impulse response (IIR) filter or a finite impulse response (FIR) filter.

14. The repeater of claim 1, further comprising a controller configured to disable or enable one or more uplink frequency ranges or downlink frequency ranges on a carrier-specific basis.

15. The repeater of claim 1, wherein the SDF is further configured to filter out-of-band frequency ranges adjacent to the uplink frequency ranges and the downlink frequency ranges.

16. A repeater, comprising:

a first antenna port;

a second antenna port;

a first first-direction analog signal amplification and filtering path associated with a first-direction frequency range and communicatively coupled to the first antenna port;

a second first-direction analog signal amplification and filtering path associated with the first-direction frequency range and communicatively coupled to the second antenna port;

a first-direction software-defined filtering (SDF) communicatively coupled between the first first-direction analog signal amplification and filtering path and the second first-direction analog signal amplification and filtering path;

a first second-direction analog signal amplification and filtering path associated with a second-direction frequency range and communicatively coupled to the first antenna port;

a second second-direction analog signal amplification and filtering path associated with the second-direction frequency range and communicatively coupled to the second antenna port; and a second-direction SDF communicatively coupled between the first second-direction analog signal amplification and filtering path and the second second-direction analog signal amplification and filtering path, wherein the first-direction SDF and the second direction SDF are comprised in a single SDF;

further comprising a second SDF in one or more of amplification and filtering paths comprising:

the first first-direction analog signal amplification and filtering path; or the second first-direction analog signal amplification and filtering path; or the first second-direction analog signal amplification and filtering path; or the second second-direction analog signal amplification and filtering path;

wherein the first-direction SDF and the second-direction SDF are configured to down-convert, digitally filter, and up-convert a first signal in a first band; and the second SDF is configured to down-convert, digitally filter, and up-convert a second signal in a second band on the one or more amplification and filtering paths;

wherein the second SDF includes an input path and an output path, and one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

17. The repeater of claim 16, wherein the first-direction is an uplink direction and the second-direction is a downlink direction.

18. The repeater of claim 16, wherein:

the first-direction SDF includes digital filtering at or near baseband and is operable to create a dynamically adjustable passband for a plurality of first-direction frequency ranges; and the second-direction SDF includes digital filtering at or near baseband and is operable to create a dynamically adjustable passband for a plurality of second-direction frequency ranges.

19. The repeater of claim 18, wherein the plurality of first-direction frequency ranges includes a band 12 (B12) uplink frequency range to carry a B12 uplink signal and a band 13 (B13) uplink frequency range to carry a B13 uplink signal on one of the first first-direction analog signal amplification and filtering path or the second first-direction analog signal amplification and filtering path, and the plurality of second-direction frequency ranges includes a B12/B13 downlink frequency range to carry a B12/B13 downlink signal on one of the first second-direction analog signal amplification and filtering path or the second second-direction analog signal amplification and filtering path.

20. The repeater of claim 16, wherein the first-direction SDF and the second-direction SDF each include an input path and an output path, and wherein the first-direction SDF and the second-direction SDF each include one or more of: a digital signal processor (DSP), a digital-to-analog converter (DAC), an analog-to-digital converter (ADC), a gain block, a multiplexer, a demultiplexer, a log power detector, a power amplifier, one or more digital filters or one or more analog filters.

21. A repeater, comprising:

a first antenna port;

a second antenna port;

a first uplink analog signal amplification and filtering path associated with an uplink frequency range and communicatively coupled to the first antenna port;

a second uplink analog signal amplification and filtering path associated with the uplink frequency range and communicatively coupled to the second antenna port;

a first downlink analog signal amplification and filtering path associated with a downlink frequency range and communicatively coupled to the second antenna port;

a second downlink analog signal amplification and filtering path associated with the downlink frequency range and communicatively coupled to the first antenna port;

an software-defined filtering (SDF) communicatively coupled between the first uplink analog signal amplification and filtering path and the second uplink analog signal amplification and filtering path, wherein the SDF includes digital filtering at or near baseband and is operable to create a dynamically adjustable passband for a plurality of uplink frequency ranges; and the SDF communicatively coupled between the first downlink analog signal amplification and filtering path and the second downlink analog signal amplification and filtering path, wherein the SDF includes digital filtering at or near baseband and is operable to create a dynamically adjustable passband for a plurality of downlink frequency ranges; and a controller configured to:

determine a power measurement of an uplink analog signal for an uplink frequency range in the plurality of uplink frequency ranges, wherein the power measurement is received from the SDF or the power measurement is received from an external circuit that performs the power measurement of the uplink analog signal;

determine an automatic gain control (AGC) level for the uplink analog signal based on the power measurement of the uplink analog signal; and apply the AGC level to the uplink analog signal.

22. A repeater, comprising:

a first antenna port;

a second antenna port;

a first uplink analog signal amplification and filtering path associated with an uplink frequency range and communicatively coupled to the first antenna port;

a second uplink analog signal amplification and filtering path associated with the uplink frequency range and communicatively coupled to the second antenna port;

a first downlink analog signal amplification and filtering path associated with a downlink frequency range and communicatively coupled to the second antenna port;

a second downlink analog signal amplification and filtering path associated with the downlink frequency range and communicatively coupled to the first antenna port;

an software-defined filtering (SDF) communicatively coupled between the first uplink analog signal amplification and filtering path and the second uplink analog signal amplification and filtering path, wherein the SDF includes digital filtering at or near baseband and is operable to create a dynamically adjustable passband for a plurality of uplink frequency ranges; and the SDF communicatively coupled between the first downlink analog signal amplification and filtering path and the second downlink analog signal amplification and filtering path, wherein the SDF includes digital filtering at or near baseband and is operable to create a dynamically adjustable passband for a plurality of downlink frequency ranges;

wherein:

the dynamically adjustable passband is for the plurality of uplink frequency ranges, and a controller is configured to determine automatic gain control (AGC) levels for the plurality of uplink frequency ranges on a per-frequency range basis by adjusting the dynamically adjustable passband created using the SDF;

the dynamically adjustable passband is for the plurality of downlink frequency ranges, and the controller is configured to determine automatic gain control (AGC) levels for the plurality of downlink frequency ranges on a per-frequency range basis by adjusting the dynamically adjustable passband created using the SDF; and wherein the plurality of uplink frequency ranges are uplink channels and the plurality of downlink frequency ranges are downlink channels.

\* \* \* \* \*